(12) United States Patent
Matsuura et al.

(10) Patent No.: US 7,856,311 B2
(45) Date of Patent: Dec. 21, 2010

(54) INFORMATION PROVIDING DEVICE

(75) Inventors: Satoshi Matsuura, Kyotanabe (JP); Takahiro Kudo, Katano (JP); Jun Ozawa, Nara (JP); Mototaka Yoshioka, Moriguchi (JP)

(73) Assignee: Panasonic Corporation, Osaka (JP)

( * ) Notice: Subject to any disclaimer, the term of this patent is extended or adjusted under 35 U.S.C. 154(b) by 833 days.

(21) Appl. No.: 10/546,401

(22) PCT Filed: Feb. 13, 2004

(86) PCT No.: PCT/JP2004/001540

§ 371 (c)(1),
(2), (4) Date: Aug. 18, 2005

(87) PCT Pub. No.: WO2004/075137

PCT Pub. Date: Sep. 2, 2004

(65) Prior Publication Data

US 2006/0149459 A1 Jul. 6, 2006

(30) Foreign Application Priority Data

Feb. 19, 2003 (JP) ............................... 2003-041095

(51) Int. Cl.
*G01C 21/00* (2006.01)
(52) U.S. Cl. ...................................... 701/201; 701/200
(58) Field of Classification Search .................. 701/201, 701/202, 207, 209, 213
See application file for complete search history.

(56) References Cited

U.S. PATENT DOCUMENTS

| 6,864,807 | B2 * | 3/2005 | Todoriki et al. | 340/988 |
| 2001/0029183 | A1 * | 10/2001 | Ito | 455/456 |
| 2002/0133560 | A1 * | 9/2002 | Hara | 709/213 |
| 2002/0143490 | A1 * | 10/2002 | Maeda et al. | 702/150 |
| 2003/0008670 | A1 * | 1/2003 | Katoh | 455/456 |
| 2004/0128066 | A1 * | 7/2004 | Kudo et al. | 701/204 |

FOREIGN PATENT DOCUMENTS

| JP | 11-083531 | 3/1999 |
| JP | 2002-056024 | 2/2002 |
| JP | 2002-297028 | 10/2002 |
| JP | 2002-367092 | 12/2002 |
| WO | 03/014670 | 2/2003 |

* cited by examiner

Primary Examiner—Jack Keith
Assistant Examiner—Imran Mustafa
(74) Attorney, Agent, or Firm—Wenderoth, Lind & Ponack, L.L.P.

(57) ABSTRACT

An information providing system that provides information to a traveling user, includes a visit history record unit which detects that the user visits a place which is away from a user's living area in order to generate a travel history, and records, as a visit history, the travel history together with a visit area which represents the visited place. Moreover, the information providing system includes a visit history database, a facility information database which provides the user with the information regarding the visit area recorded in the visit history database, and a facility information search unit.

16 Claims, 27 Drawing Sheets

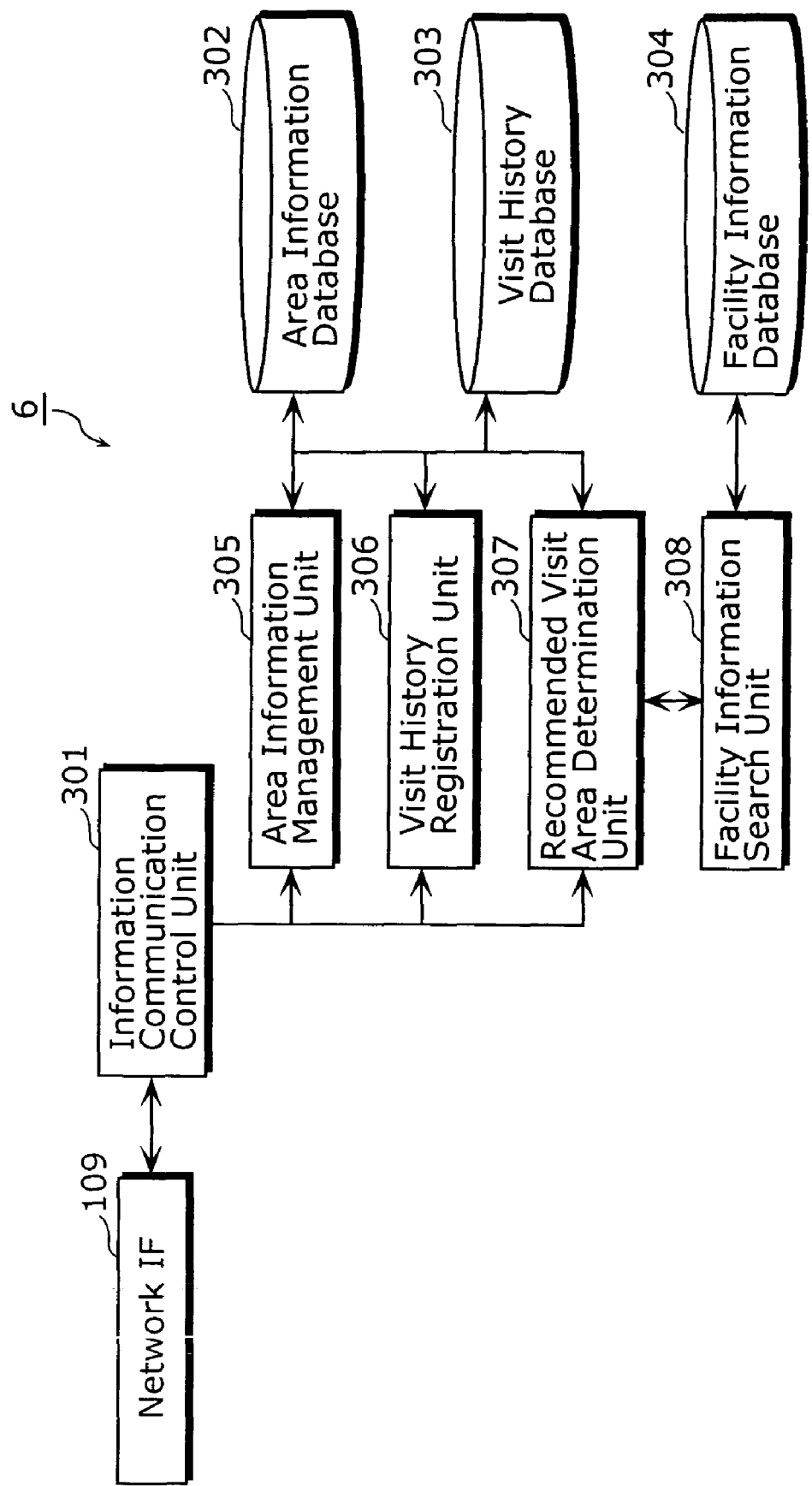

FIG. 6

| User ID | Month/Day/Year | Visit History |
|---|---|---|
| A | 02/01/2003 | {(B11, 11:30, 60),(B12, 13:00, 120),(B13, 15:30, 60)} |
| B | 02/02/2003 | {(B11, 12:30, 60),(B12, 14:00, 120),(B13, 16:00, 60), (B14, 18:00, 120)} |
| ... | ... | ... |

| Facility Identifier | Area Identifier | Facility Name | NEWS |
|---|---|---|---|
| Facility 1 | B11 | Bistro Doog | Features: Ohmi Beef Specials ... |
| Facility 2 | B12 | Market-Zone | Clearance ... |
| Facility 3 | B12 | Modern-Living | New models arrive ... |
| Facility 4 | B12 | Sports-Plaza | Winter Clearance until February 16 ... |
| Facility 5 | B12 | Book Born | ew Release "Harry ... |
| Facility 6 | B13 | Cafe' LEAF | Seasonal Fruits ... |
| Facility 6 | B14 | Olio's Restaurante | New Dishes, Pasta ... |
| Facility 8 | B15 | Seaside Park | Hours: Open ... |
| ... | ... | ... | ... |

| Area Identifier | Position |
|---|---|
| B1 | xx-yy, Block xxyy, Kyotanabe-city, Kyoto-prefecture |
| B2 | xx- xx, Block zzxx, Kyotanabe-city, Kyoto-prefecture |
| B3 | zz-zz, Block xxzz, Seika-town, Souraku-county, Kyoto-prefecture |
| B4 | zz-xx, Block zzxx, Seika-town, Souraku-county, Kyoto-prefecture |

FIG. 14

| Area Identifier | Position |
|---|---|
| B11 | yy- yy, Block xxyy, Ohtsu-city, Shiga-prefecture |
| B12 | xx- xx, Block zzxx, Ohtsu-city, Shiga-prefecture |
| B13 | zz-zz, Block xxzz, Ohtsu-city, Shiga-prefecture |

| Area Identifier | Position |
|---|---|
| D1 | Soraku-county, Kyoto-prefecture··· |
| D2 | Kyoto-city, Kyoto-prefecture··· |
| D3 | Yamato-city, Kyoto-prefecture··· |
| D4 | Ryousei-city, Kyoto-prefecture··· |
| D5 | Sagamihara-city, Kanagawa-prefecture··· |
| D6 | Marugame-city, Kanagawa-prefecture··· |
| D7 | Sado-city, Kanagawa-prefecture··· |
| D8 | Kiyosato-city, Kanagawa-prefecture··· |
| D9 | Doi-city, Kanagawa-prefecture··· |
| D10 | Furuta-city, Akita-prefecture··· |
| D11 | Kamo-city, Akita-prefecture··· |
| D12 | Sekiya-city, Akita-prefecture··· |
| D13 | Matsunaga-city, Akita-prefecture··· |
| D14 | Osumi-county, Akita-prefecture··· |
| ··· | ··· |

| Area Identifier | Near Facility | Position |
|---|---|---|
| E1 | International Ski Area | Ohsaku-county, Gifu-prefecture··· |
| E2 | Snow Park | Ohmiya-county, Gifu-prefecture··· |
| E3 | Snowy Ski Resort | Erimo-county, Gifu-prefecture··· |
| ··· | ··· | ··· |

| Date / Time | Latitude | Longitude | Now Traveling | Reference Area | Visit Area |
|---|---|---|---|---|---|
| 02/04/2003 13:21:10 | ... | ... | ○ | — | — |
| 02/04/2003 13:21:15 | ... | ... | — | D1 | — |
| 02/04/2003 13:21:30 | ... | ... | — | D1 | — |
| ... | ... | ... | | | |
| 02/05/2003 8:15:10 | ... | ... | ○ | — | — |
| 02/05/2003 8:16:15 | ... | ... | — | — | E1 |
| 02/05/2003 8:16:30 | ... | ... | — | — | E1 |
| 02/05/2003 8:18:01 | ... | ... | ○ | — | — |
| ... | ... | ... | | | |

FIG. 26

| User Name | Reference Area | Visit Area |
|---|---|---|
| A1 | D1、D2 | E1 |
| A2 | D2、D3 | E1 |
| A3 | D4 | E2 |
| A4 | D5、D6 | E3 |
| A5 | D7、D9 | E2 |
| A6 | D10 | E1 |
| A7 | D11、D12 | E2 |
| ... | ... | ... |

FIG. 29

Please input your profiles.

| | |
|---|---|
| Sex | male |
| Hobby | outdoor sports |
| Number of Your Family Member | 4 |
| How many times do you visit amusement parks per year? | 5 times |
| Type of Your Car | 4WD |

FIG. 30

| Area Information | Population (person) | Area (square km) | Population density (person / square km) | Famous Spot |
|---|---|---|---|---|
| Kyoto | 2,645,796 | 4,613.07 | 573.54 | Sightseeing Area |
| Nara | 1,434,576 | 3,691.09 | 388.66 | Sightseeing Area |
| ... | | | | |
| Tokyo | 12,369,185 | 2,187.05 | 5,655.65 | Commercial City |
| Osaka | 8,831,177 | 1,893.73 | 4,663.38 | Commercial City |
| ... | | | | |

INFORMATION PROVIDING DEVICE

BACKGROUND OF THE INVENTION

The present invention relates to an information providing apparatus, and more particularly to an apparatus for providing a user visiting an unfamiliar area with information of the area.

By using a vehicle navigation apparatus, a mobile information terminal with a global positioning system (GPS), and the like, it is possible to obtain information regarding facilities and sightseeing spots in a destination. However, there is a case that a user carrying such an apparatus strolls a firstly visited area for a trip or the like, where there are facilities and sightseeing spots in which the user would be interested, but the user cannot promptly obtain information of those places, and eventually misses to visit them.

Conventionally, among technologies for providing a traveling user with suitable information, one technology has been proposed to divide a map into rectangular areas, and change a detail degree of the information to be provided, depending on how many times the user has visited each rectangular area (Japanese Patent Laid-Open No. 11-83531 publication for an invention entitled "Information Providing Apparatus", for example). The conventional information providing apparatus can provide the user visiting an unfamiliar area with more detailed information than information regarding a user's familiar area.

Furthermore, a service model has been proposed that a server receives area information from local people, and provide a traveler with information which is received from an local person whose profile is similar to the traveler's profile (Japanese Patent Laid-Open No. 2002-56024 publication for an invention entitled "Travel Destination Information Providing method", for example). This conventional method can provide the user with information received from local people whose profiles are similar to a user's profile, thereby providing the user with high-quality information as compared to information for business which is received from shops.

However, the above conventional information providing apparatus provides the information depending on only how many times the user has visited or passed through the area, so that the information is not adequately reflected with user's purposes or behavior patterns, which causes a problem that the information includes unnecessary information for the user or does not include necessary information.

Furthermore, the above conventional travel destination information providing method does not reflect characteristics in which the local people and the traveler have different interests, which causes a problem that the information is not always useful for the traveler. The reason is, for example, that the local people do not use accommodation facilities nor buy souvenirs, so that the local people are not always able to provide information that is useful for the traveler.

SUMMARY OF THE INVENTION

An object of the present invention is to provide an information providing apparatus that can properly provide a user visiting an unfamiliar area for a trip or the like with information of the area. More specifically, the present invention can provide the user with high-quality information that includes only information useful for the user visiting an unfamiliar area in order to reduce noises.

In order to achieve the above object, according to the present invention, an information providing apparatus which provides information to a traveling user, the information providing apparatus including: a visit history record unit operable detect that the user visits a place which is away from a user's living area in order to generate a travel history, and to record, as a visit history, the travel history together with a visit area which represents the visited place; and an information providing unit operable to provide the user with information regarding the visit area which is recorded by the visit history record unit. Accordingly, it is possible to provide the user with the information regarding the visit areas except the user' living area, which enables to share the travel histories of only travelers except local people, thereby achieving to provide the travelers with high-quality information.

Here, the visit history record unit may include: a travel history record unit operable to record the travel history of the user; a reference area extraction unit operable to extract a reference area from the recorded travel history, the reference area being a place where the user has stayed more than certain times; and a visit extraction unit operable to extract a visit area from the recorded travel history, the visit area being a place where the user has stayed and which is far from the extracted reference area with a certain distance; and a visit history storage unit operable to stores a visit history, the visit history being a travel history including the extracted visit area, for example.

Further, the travel history record unit may be operable to record the travel history by recording a position of the user every predetermined time period, and the reference area extraction unit may be operable to extract a reference area from the travel history, the reference area being a place where the user has stayed within a predetermined time period more than predetermined times. Accordingly, it is possible to extract, as the reference areas, places where the user often visits (user's living area) and extract, as the visit areas, places where the user seldom visits.

Furthermore, the visit history record unit may be operable to record visit histories of a plurality of users, and the information providing unit may be operable to provide the information by referring to a visit history of another user who has visited the user's visit area, the visit history to be provided being extracted from the visit histories recorded by the visit history record unit. Accordingly, for example by sharing the travel history information of a plurality of users who have visited the same area, it is possible to use the information of one user for other users.

For example, by providing information of a visit area which is different from the user's visit area, the visit area to be provided being extracted from visit areas included in the visit history of the another user, it is possible to recommend visit areas where the user has not yet been visited. Furthermore, by providing information of a visit area where many other users have visited, the visit area to be provided being extracted from visit areas which are different from the user's visit area, it is possible to recommend the user popular visit areas. Still further, by recording, as the visit history, in addition to the visit area, a travel history which includes one of a time, a stay period, a day of the weak, a weather, and a season regarding when the user visits the visit area, and providing information of a visit area whose information matches one of a time, a stay period, a day of the weak, a weather, and a season regarding a current time, the visit area to be provided being extracted from the visit histories recorded in the visit history record unit, it is possible to determine a visit area to be recommended by using similar situations or behavior patterns of similar users, which enables to provide the user with more useful information.

Furthermore, the visit history record unit may be operable to record, as the visit history, in addition to the visit area, a travel history includes the reference area of the user, and the information providing unit may be operable to specify another user whose visit area is same as or similar to the visit area included in the user's visit history, and whose reference area is same as or similar to the reference area included in the user's visit history, and to provide the information by using a visit history of the specified another user. Accordingly, by sharing not only other user's visit areas that are the same as the user's visit area, but also other user's reference areas that are the same as the user's reference area, it is possible to use information of other users whose living areas are the same as the user's living area.

For example, the information providing unit may be operable to provide information regarding a return route from the user's visit area, by using the travel history included in the visit history of the another user, which enables to provide the user with a route from a visited place to a user's home.

Furthermore, the information providing unit may be operable to hold a facility database which includes information of a facility in an area to be the visit area, and to provide the information of the facility included in the facility database, as information regarding the visit area. Accordingly, it is possible to provide useful information regarding facilities and sightseeing spots located in the visit area.

As described above, when the user visits an unfamiliar place, the present invention can recommend the user places and information regarding the places by checking user's behavior patterns up to a current time and then using another user's behavior patterns that are similar to the user's behavior patterns. Accordingly, the present invention can provide the user with high-quality information that includes only information useful for the user visiting an unfamiliar area in order to reduce noises.

Furthermore, by automatically registering, in the server apparatus, the visit history of areas except the reference area, it is possible to register more visit histories of users than visit histories registered by user's entries, it is possible to share a lot of useful information within a plurality of users.

Still further, the present invention can be implemented not only as the information providing apparatus, but also as a method for providing information, as an information providing system including a mobile terminal and a server apparatus which are connected with each other via a communication path, and as a program for causing a computer to provide the information. Moreover, it is obvious that the program can be widely distributed via a recording medium, such as a DVD, or a transmission medium, such as the Internet.

BRIEF DESCRIPTION OF DRAWINGS

FIG. 4 is a functional block diagram showing a server apparatus in the information providing system.

FIG. 6 is a diagram showing one example of data in a visit history database in the server apparatus.

FIG. 7 is a diagram showing one example of data in a facility information database in the server apparatus.

FIG. 13 is a diagram showing one example of data in a reference area storage unit.

FIG. 14 is a diagram showing one example of a visit history list.

FIG. 22 is a diagram showing one example of a reference area database in the server apparatus.

FIG. 23 is a diagram showing one example of a visit area database in the server apparatus.

FIG. 24 is a diagram showing one example of a visit destination travel history data in the server apparatus.

FIG. 26 is a diagram showing one example of a collection of a plurality of the visit place travel history information of each user shown in FIG. 24.

FIG. 29 is a diagram showing one example in which the user inputs, as initial profiles, data of a sex, a hobby, and a number of family members, by using the in-vehicle terminal or the like.

FIG. 30 is a diagram showing one example of profile information of a reference area.

DETAILED DESCRIPTION OF THE INVENTION

The following describes the information providing system according to the present invention with reference to the drawings.

First Embodiment

Figure 1:
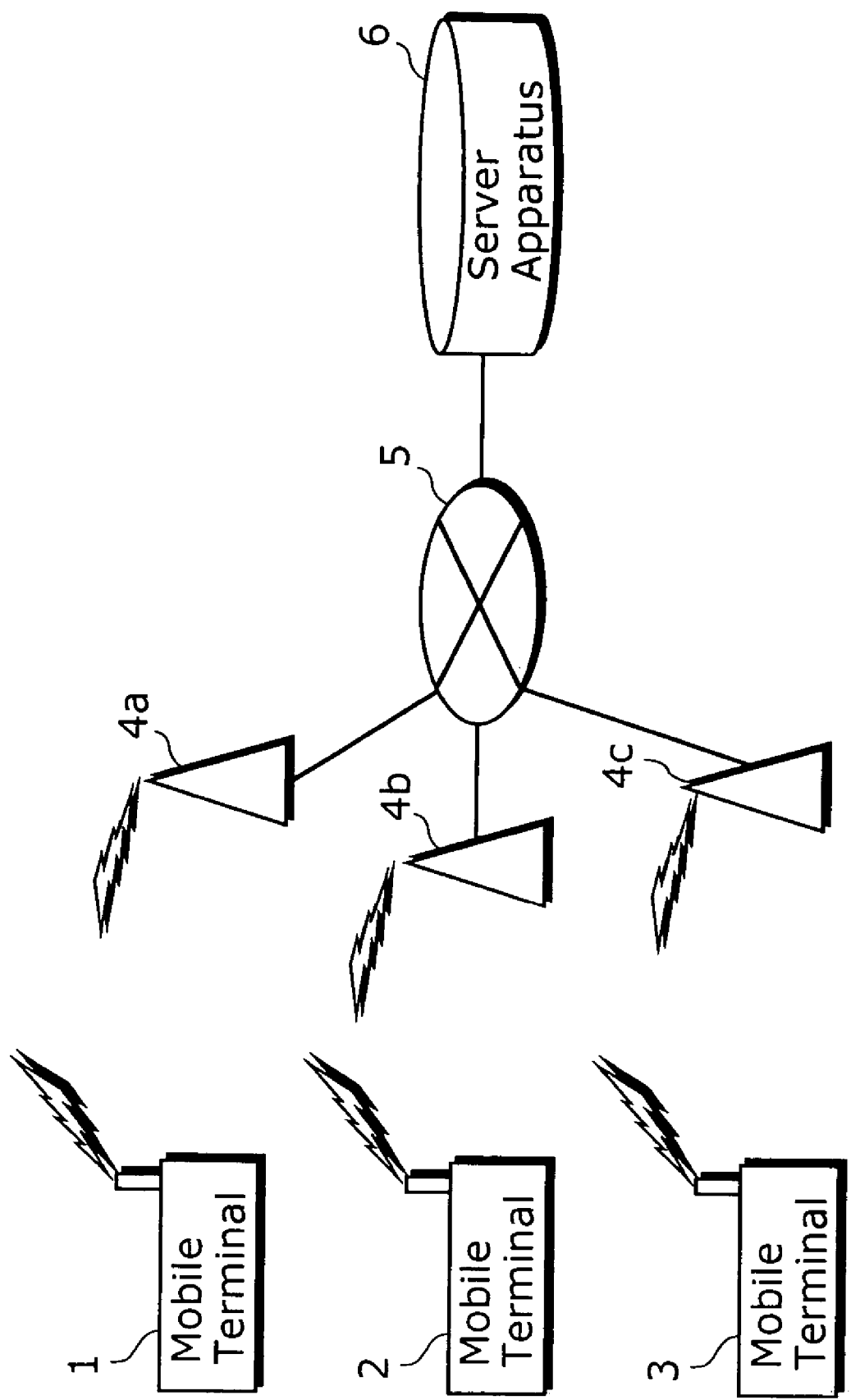
FIG. 1 is a diagram showing an overall structure of an information providing system according to a first embodiment of the present invention.

FIG. 1 is a diagram showing an overall structure of an information providing system according to a first embodiment of the present invention. In the information providing system, a plurality of mobile terminals 1 to 3 are connected to a server apparatus 6 on the Internet 5, via wireless base stations 4a to 4c. Examples of the wireless medium are a portable telephone, a personal handy phone system (PHS), a wireless LAN, and the like.

Figure 2:
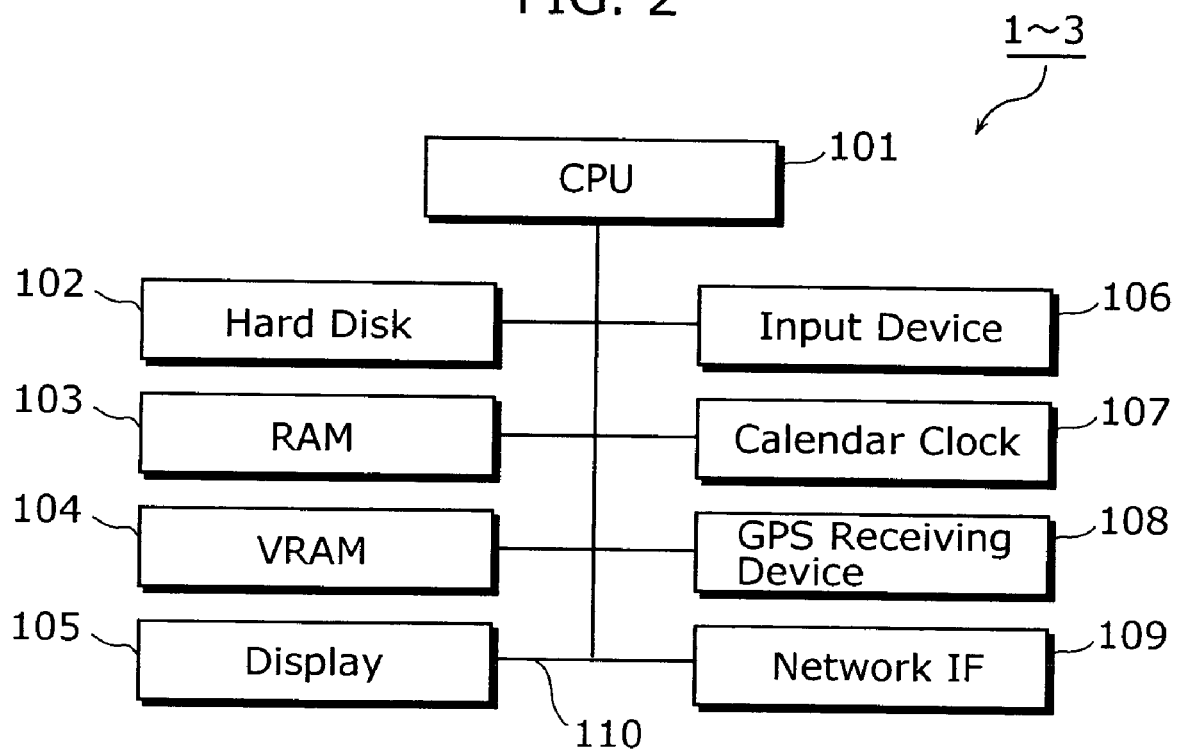
FIG. 2 is a diagram showing a hardware structure of a mobile terminal in the information providing system.

FIG. 2 is a diagram showing a hardware structure of a navigation device that is one example of the mobile terminals 1 to 3 shown in FIG. 1. The structure includes, as the basic parts, elements used in a general-purpose computing system.

A CPU 101 is a processor that controls the whole navigation device. A hard disk 102 is a supplementary storage unit that stores: data including images, texts, sounds necessary for displaying a map; data of registration information inputted by a user and past travel routes; and programs for causing the navigation device to execute a route search, a route guidance, a speech recognition, and the like. A RAM 103 is a memory that stores executable codes of the program and also stores parameters necessary for the program execution. A VRAM 104 is a video memory that temporarily holds the display data and the like generated by the CPU 101. A display 105 is a liquid crystal display (LCD) or the like that reads out the data held in the VRAM 104 every certain time period and displays the readout data. An input device 106 is a touch panel or the like that receives an entry from the user. A calendar clock 107 is a calendar timer that provides information of a year, a month, a date, and a day of the week. A GPS receiving device 108 is a device that detects geographical position information of a traveling object indicated by latitude and longitude, from signals received from global positioning system (GPS) satellites. A network IF 109 is a network interface that establishes a connection with the server apparatus 6 on the Internet. A local bus 110 is an internal bus that is used to send and receive data among the above devices 102 to 109, under the control of the CPU 101.

Note that the hard disk 102 can be substituted by a combination of a ROM medium, such as an optical disc, and a rewritable non-volatile memory, such as a flash memory.

Figure 3:
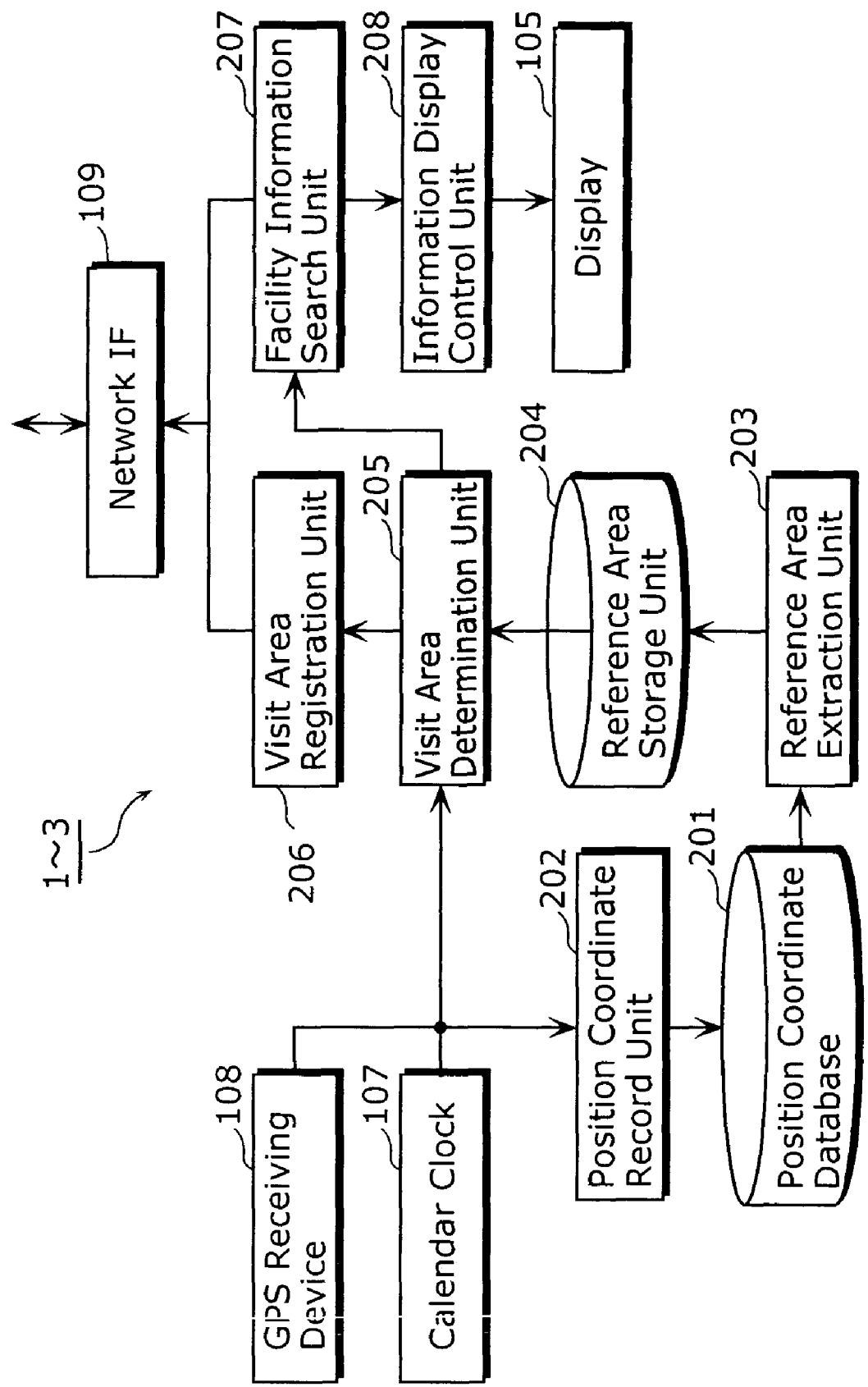
FIG. 3 is a functional block diagram showing the mobile terminal.

FIG. 3 is a functional block diagram showing a hardware structure of one of the mobile terminals (navigation devices) 1 to 3 shown in FIG. 2. Note that the block diagram includes the same elements shown in the hardware structure of FIG. 2 so that the same elements are designated by the same reference numerals in FIG. 3 and their functions are the same as described above. A position coordinate database 201 is a storage unit that accumulates position coordinates recorded within a predetermined time period. A position coordinate record unit 202 is a processing unit that records, into the position coordinate database 201, a current position of the traveling object indicated by latitude and longitude based on the information obtained from the GPS receiving device 108. A reference area extraction unit 203 is a processing unit that refers to the position information obtained by the server apparatus 6 and area information including an identifier, and extracts, from the position coordinate database 201, an identifier of an area in a living region where the user often visits, which is an area used as a reference point for specifying user's usual behavior region (hereafter, referred to as "reference area"). A reference area storage unit 204 is a storage unit that stores the reference area which is extracted by the reference area extraction unit 203. A visit area determination unit 205 is a unit that determines whether or not the current position is within an area where the user seldom visits for a trip or the like (hereafter, referred to as "visit area"), by calculating a distance between the current position and the reference area stored in the reference area storage unit 204. A visit area registration unit 206 is a processing unit that registers, into the server apparatus 6, visit history of areas where the user visits after leaving the reference area until returning to the reference area. A facility information search unit 207 is a processing unit that sends the visit area history up to a current time to the server apparatus 6 and obtains information of facilities to be recommended to the user. An information display control unit 208 is a control unit that displays, to the display 105, the facility information obtained from the server apparatus 6 by the facility information search unit 207.

Figure 5A:
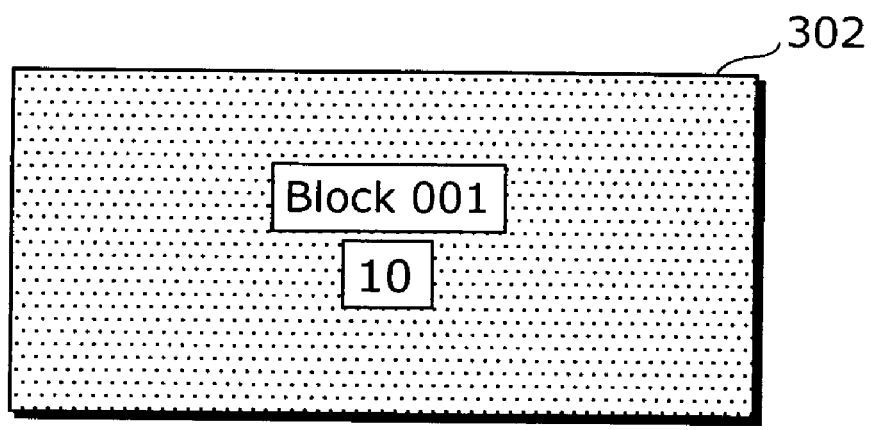
FIGS. 5A and 5B show examples of data in an area information database in the server apparatus.
Figure 5B:
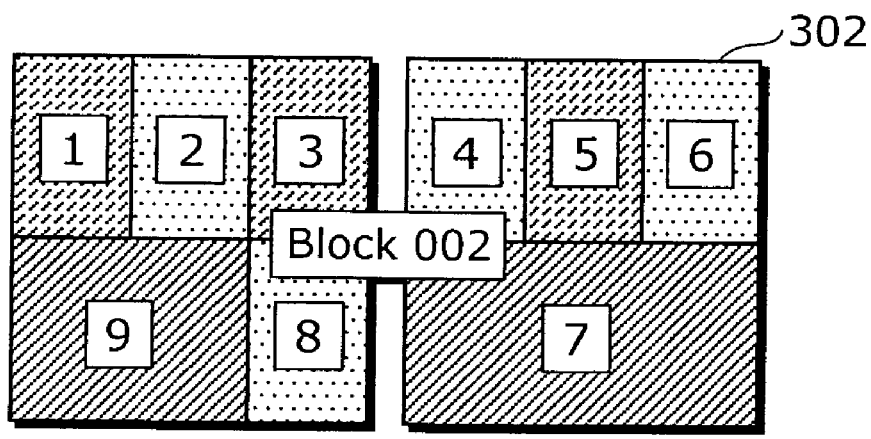

FIG. 4 is a functional block diagram showing a structure of the server apparatus 6 in FIG. 1. An information communication control unit 301 is a processing unit that receives requests from the mobile terminals 1 to 3, and controls accesses to various databases. An area information database 302 is a storage unit that stores a shape and dimensions of each area as shown in FIGS. 5A and 5B. A visit history database 303 is a storage unit that stores the visit history of each user, as an array of a structure including an area identifier, a visit time, a stay period as shown in FIG. 6. A facility information database 304 is a storage unit that stores the facility information in association with the area identifier as shown in FIG. 7. An area information management unit 305 is a processing unit that searches, from the area information database 302, an area including position coordinates sent from the mobile terminals 1 to 3, and manages the area identifier. A visit history registration unit 306 is a processing unit that receives the visit history from the mobile terminals 1 to 3, and registers the visit history into the visit history database 303. A recommended visit area determination unit 307 is a processing unit that searches the visit history database 303 based on the visit histories up to a current time received from the mobile terminals 1 to 3, and determines a visit area to be recommended to the user. A facility information search unit 308 is a processing unit that searches, from the facility information database 304, information of a facility which exists in the area determined by the recommended visit area determination unit 307.

Note that elements in the hardware structure of the server apparatus 6 are the same as elements in the general-purpose computing system, so that the elements are not shown nor described herein. Note also that, when there are a plurality of facilities in an area, data including a title representing a whole area is described in a head record of the area information in the facility information database 304. For example, in FIG. 7, an area B12 has a plurality of facilities, but "Market-Zone", which is in a head record of the area information, is used as a title representing the whole area B12.

The following describes the area information database 302 with reference to FIGS. 5A and 5B. The area information database 302 is a database that stores position coordinates for determining each area and an identifier for identifying the area. Note that the position coordinates may be indicated by any forms, if possible to determine each area, and examples of such position coordinates are indicated by: a range of each area (Latitude: XX to WW North/Longitude: YY to ZZ East); reference coordinates (Latitude: XX North/Longitude: YY East) and a distance from the reference coordinates using as a center (WW km long, ZZ km wide, or XX km Radius r); coordinates determined by drawing lines from a plurality of designated representative coordinates (Latitude: XX North/Longitude: YY East); the reference coordinates (Latitude: XX North/Longitude: YY East) or the representative coordinates (Latitude: XX North/Longitude: YY East), and a shape of the area region (Square, WW km long, ZZ km wide, or Triangle); and the like. Note also that the position coordinates may be previously set based on address information such as prefecture, city, block, post code, and the like. Note also that it is possible to use an indication form for roughly dividing a map based on the above address information and then segmenting the divided region into more detailed areas.

FIG. 5A shows one example in which Block 001 is identified by an identifier 10, while FIG. 5B shows another example in which Block 002 is segmented into areas identified by a plurality of identifiers 1 to 9. Note that the areas can be divided by each user, but it is preferable to be previously divided in consideration of total statistics. However, the setting of the areas can be changed depending on user's interests and tastes, the number of facilities, seasonal changes of events in sightseeing spots, and the like.

FIG. 6 is a diagram showing one example of the visit history database 303. As shown in FIG. 6, the visit history database 303 has a user identification for identifying each user, a stay date (including month/date/year), and a visit history (including an area identifier, a visit time, and a stay period). Here, in a visit history (B11, 11:30, 60), B11 represents area information, 11:30 represents a stay start time, and 60 represents a stay period of 60 minutes.

First Operation Example

The following describes the first operation example performed by the information providing system according to the first embodiment of the present invention with the above-described structure.

Figure 8:
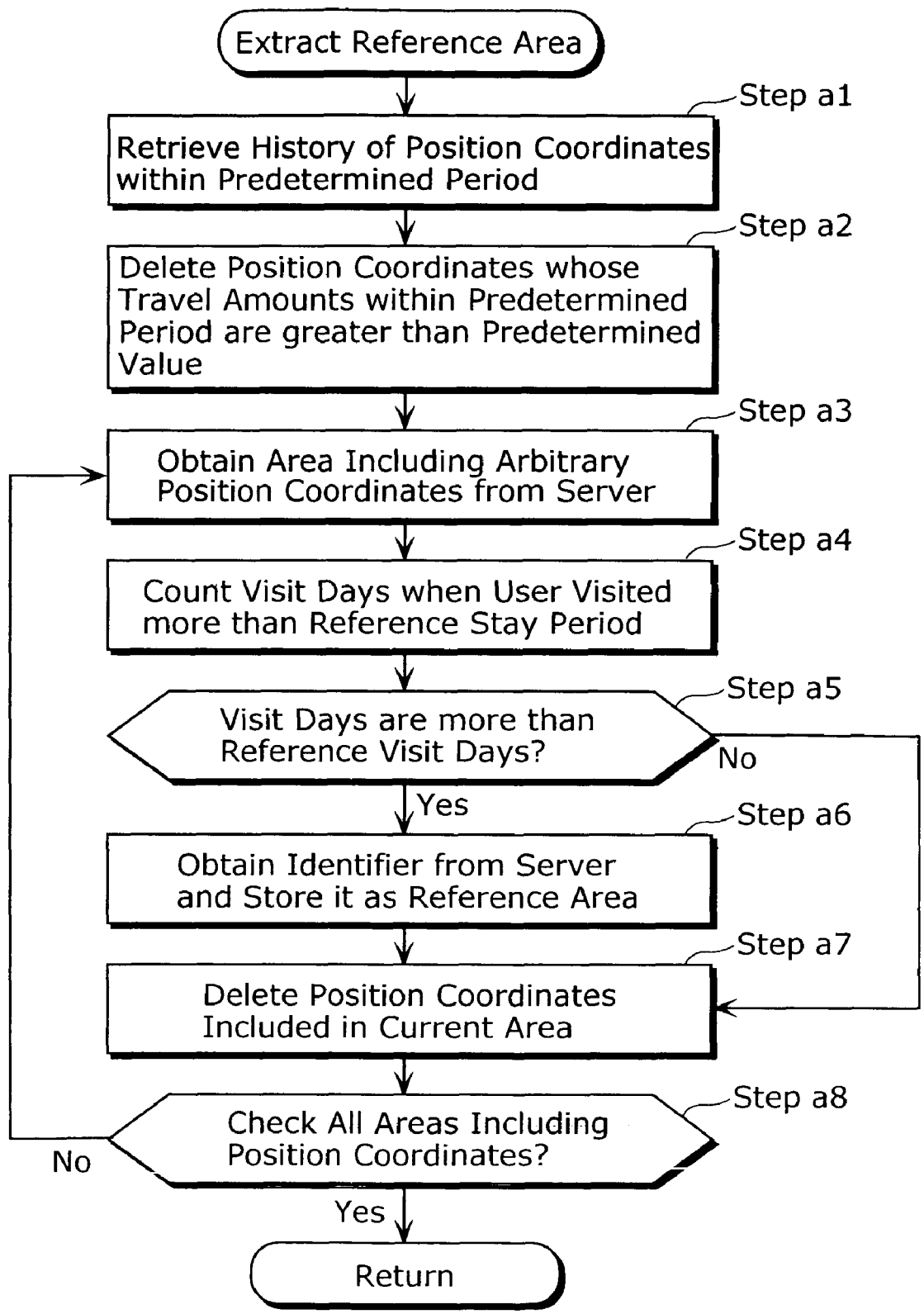
FIG. 8 is a flowchart showing processing performed by the mobile terminal according to the first embodiment.
Figure 9:
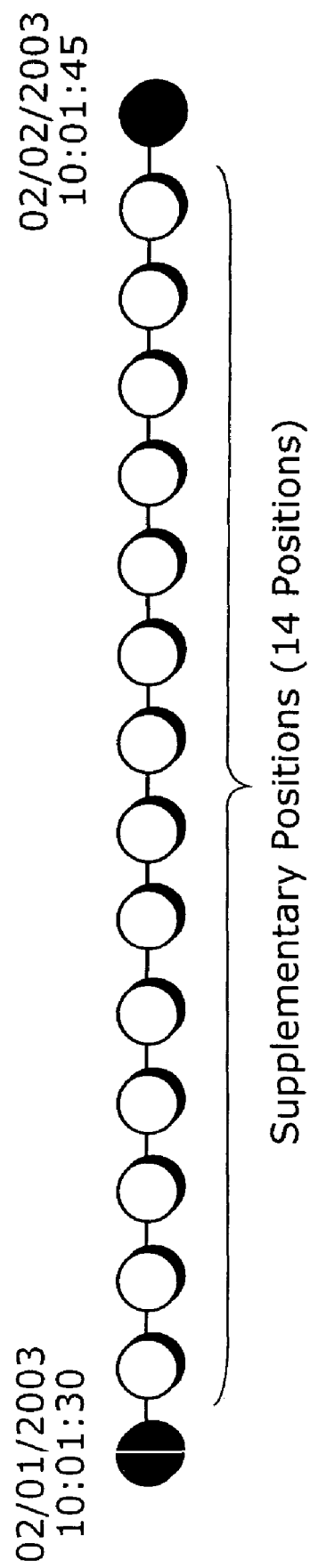
FIG. 9 is a diagram showing a method for supplementing position coordinates.

FIG. 8 is a flowchart showing subroutine processing performed by one of the mobile terminals 1 to 3 to extract a reference area to be used as a reference point in order to determine a user's usual travel range.

Firstly, the reference area extraction unit 203 retrieves a history of position coordinates, for example a history within the past month, from the position coordinate database 201 into a work area of the reference area extraction unit 203 (Step a1). It is assumed that the position coordinate database 201 previously stores the history of a plurality of sets of position coordinates obtained by the GPS, every second for example, together with a time and a date including month, date, and year of each obtained position coordinates. Note that when tall buildings and the like prevent the GPS from determining position coordinates, it is assumed that supplementary position coordinates are calculated using a linear relationship between two already determined positions.

Next, the reference area extraction unit 203 deletes, from the work area, position coordinates whose total travel amount per minute is greater than a predetermined region (distance), for example, greater than 40 m (Step a2). Note that a threshold value used for deleting the position coordinates may be set to an appropriate value in consideration of an average travel speed of the mobile terminals 1 to 3. In the first operation example, the threshold value is set to 40 m in consideration of an average walking speed of 80 m/minute.

Subsequently, the reference area extraction unit 203 picks one set of arbitrary position coordinates from the position coordinates in the work area, and obtains, from the server apparatus 6, information of an area including the picked position coordinates (Step a3).

Then, the reference area extraction unit 203 selects, from the work area, all position coordinates included in the area obtained at Step a3, calculates a stay period of each visit using time information assigned to the position coordinates, and counts the number of days when the user stays in the area more than a predetermined time period, for example, more than ten minutes, using the date information including month, date, and year (Step a4). Note that a reference stay period used as the threshold value may be adjusted appropriately.

If the number of days counted at Step a4 is more than the reference number of visit days (hereafter, referred to as "reference visit days"), for example, more than two days, then the reference area extraction unit 203 proceeds to Step a6. If not, the reference area extraction unit 203 jumps to Step a7 (Step a5). Note that the reference visit days used as the threshold value may be voluntarily changed.

When the number of visit days is more than the reference visit days, an identifier corresponding to the current area is obtained from the server apparatus 6 and stored into the reference area storage unit 204 in association with information of the area (Step a6). Here, the area information management unit 305 in the server apparatus 6 generates new identifiers of areas about which any user does not inquire. The generated new area identifiers are managed by the area information management unit 305.

Subsequently, the reference area extraction unit 203 deletes, from the work area, all position coordinates included in the current area (Step a7).

Then, a determination is made as to whether or not there are any position coordinates in the work area, and if there are still position coordinates, then the processing loops back to Step a3 to be continued, but on the other hand, if any position coordinates do not exist, then the processing is complete and returns to an invoker (Step a8).

Figure 10:
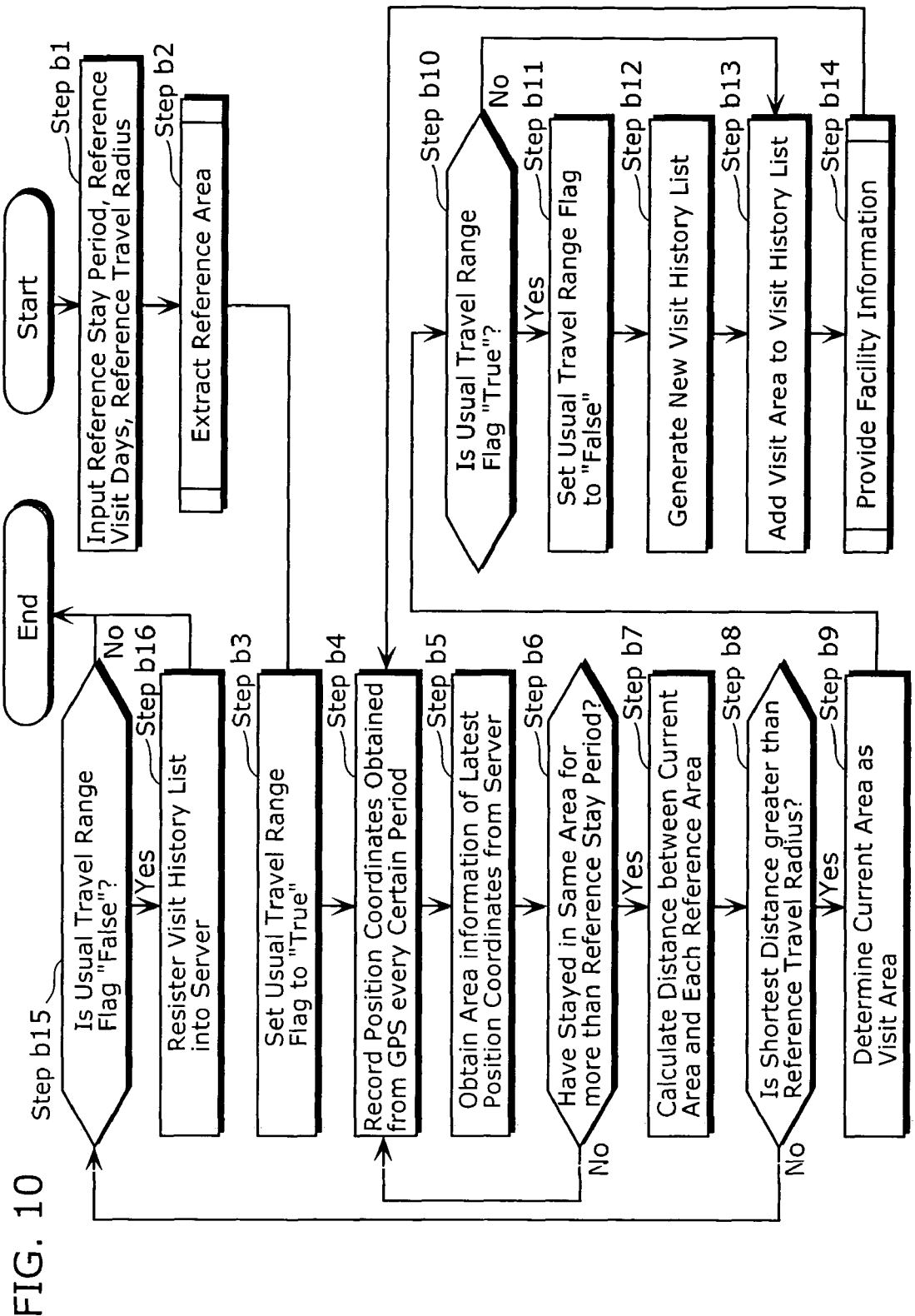
FIG. 10 is a flowchart showing processing for registering a visit history and presenting facility information.

FIG. 10 is a flowchart showing processing performed by one of the mobile terminals 1 to 3 to extract a visit area by using a distance between the visit area and the reference area, to register a visit history of the visit area into the server apparatus 6, and eventually obtain facility information based on the visit history.

Firstly, the mobile terminal 1 receives parameters for defining a user's usual travel range, such as a reference stay period, reference visit days, and a reference travel radius, which are inputted from the user by the input device 106 and the like (Step b1). Here, it is assumed that the reference stay period is ten minutes, the reference visit days is two days, and the reference travel radius is 5 km.

Next, a subroutine for extracting a reference area is called, and the processing from Step a2 to Step a8 are performed (Step b2). The processing is not necessarily performed every time, but performed about once per month in general.

Then, a usual travel range flag, which indicates whether or not the user is within the usual travel range, is initialized to "True" (Step b3).

Then, the position coordinate record unit 202 obtains coordinates of a current position from the GPS, every certain time period, for example once per second, and records the current position coordinates into the position coordinate database 201 and also stores them into a work area of the position coordinate record unit 202 (Step b4). Note that the position coordinates recorded in the position coordinate database 201 are used for extracting a reference area.

Then, the visit area determination unit 205 accesses to the server apparatus 6, every certain time period, for example once per five minutes, and eventually obtains information of an area which includes the position coordinates stored in the position coordinates record unit 202 and stores the area information as information of an area candidate (Step b5).

Then, by examining the position coordinates stored in the work area, a stay period in the area candidate obtained at Step b4 is calculated (Step b6). Note that when the area information obtained at Step b5 is the same as the area information which has been obtained last time, the stay period is multiplied. If the stay period in the area candidate is more than ten minutes, then the processing proceeds to Step b7. If not, then the processing loops back to Step b4 to be continued.

When the stay period of the area candidate is more than ten minutes, the visit area determination unit 205 calculates a shortest distance between the area candidate and the reference area stored in the reference area storage unit 204 (Step b7).

If the distance calculated at Step b7 is greater than a predetermined distance, for example, greater than 5 km, then the processing proceeds to Step b9, and if not, the processing proceeds to Step b15 (Step b8).

When the calculated distance is greater than a predetermined distance respectively, the candidate area is determined as a visit area (Step b9).

Next, the visit area determination unit 205 examines a value of the usual travel range flag, and if the value is "True", then the processing proceeds to Step b11, but on the other hand, if the value is not "True", the processing jumps to Step b13 (Step b10).

When the flag is "True", the usual travel range flag is set to "False" (Step b11), then a new visit history list is generated to store information of the determined visit area (Step b12), and the visit area is added to the visit history list (Step b13).

Next, the visit area registration unit 206 sends the generated visit history list to the server apparatus 6, and in a response to the sending, the server apparatus 6 sends to the facility information search unit 207 information of recommended facilities, and the information display control unit 208 displays the obtained facility information on the display 105 (Step b14). Subsequently, the processing loops back to Step b4 to be continued. Note that the server apparatus 6 performs processing for determining a recommended facility whose information to be provided.

After examining the value of the usual travel range flag, if the value is "False", then the processing proceeds to Step b16, but on the other hand, if the value is not "False", then the processing is complete (Step b15).

When the usual travel range flag is "False", the visit history list is sent to the server apparatus 6 and stored in the visit history database 303, and the processing is complete (Step b16).

Note that the above processing has been described to define the visit area using the shortest distance between the visit area and the reference area, but the method for defining the visit areas may be other methods, such as a method using a distance from a center of the reference area, and a method using a distance from a circumscribed curve of the reference area.

Figure 11:
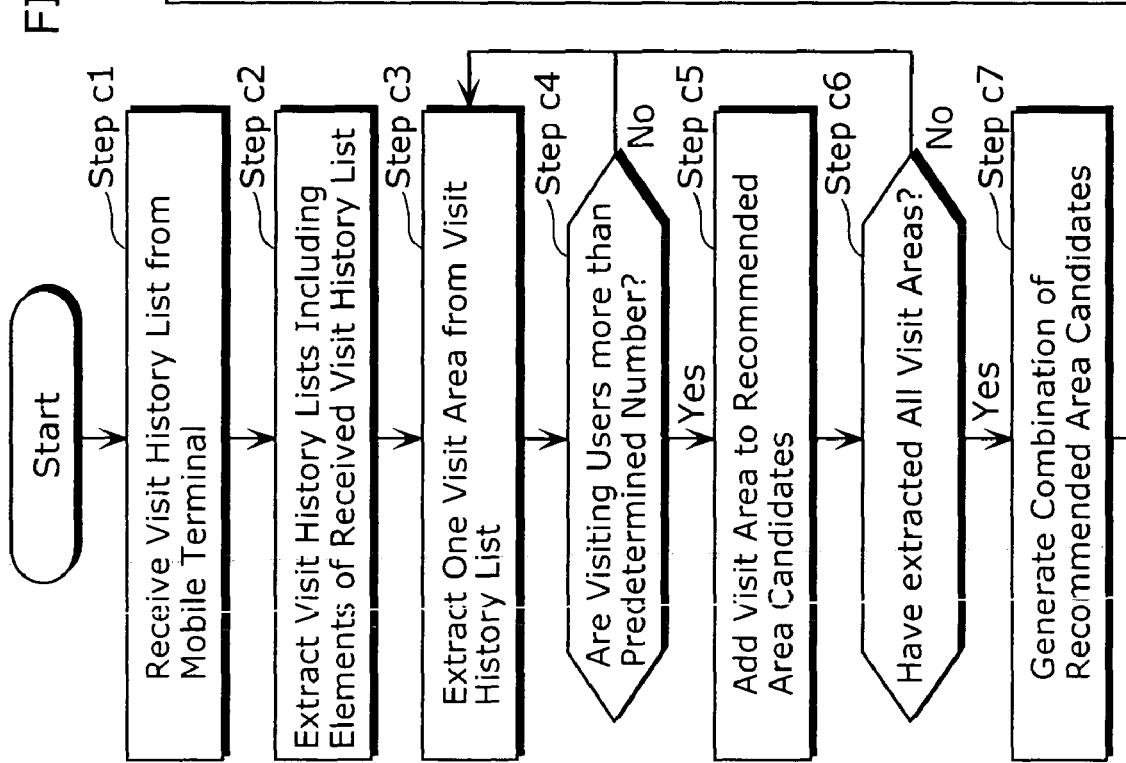
FIG. 11 is a flowchart showing processing performed by the server apparatus.

FIG. 11 is a flowchart showing subroutine processing performed by the server apparatus to determine a facility whose information is to be provided.

Firstly, the recommended visit area determination unit 307 receives the visit history list from one of the mobile terminals 1 to 3, via the network IF 109 and the information communication control unit 301 (Step c1).

Next, visit history lists of other users including the same elements in the visit history list received at Step c1 are searched and extracted from the visit history database 303, and stored them into a work area of the recommended visit area determination unit 307 (Step c2). Here, conditions of the search may be a part of the elements or all elements in the visit history list received at Step c1.

Then, the recommended visit area determination unit 307 retrieves one visit area information included in the visit history lists stored in the work area at Step c2 (Step c3), and determines whether or not the number of users who have visited the retrieved visit area is more than a predetermined number, for example more than five people, and if the number is more than five people, then the processing proceeds to Step c5, but on the other hand, if the number is not, the processing loops back to Step c3 (Step c4).

When the number of the visiting users is more than the predetermined number, then the visit area is determined as a recommended area candidate (Step c5).

By repeating the above processing, if all visit areas included in the visit history lists in the work area are retrieved and examined, the processing proceeds to Step c7, and if not, the processing loops back to Step c3 (Step c6).

When all visit areas are retrieved and examined, the recommended area candidates obtained from a plurality of users are combined to generate some groups of a plurality of candidate combinations, each of which has a certain number of elements (visit areas), the groups of candidate combinations are stored into the work area (Step c7).

Next, the recommended visit area determination unit 307 extracts one group of combination from the groups of candidate combinations in the work area (Step c8), and counts the respective number of the users who have visited respective area combinations, and if the respective numbers are more than a predetermined number respectively, for example more than five people, then the processing proceeds to Step c10, and if not, then the processing loops back to Step c8 (Step c9).

When the respective numbers are more than the predetermined number respectively, the areas in the respective extracted combinations are determined as recommended area candidates (Step c10).

By repeating the above processing, if all groups of the candidate combinations are extracted from the work area and examined, then the processing proceeds to Step c12, and if not, then the processing loops back to Step c8 (Step c11).

When all groups of the candidate combinations are extracted from the work area and examined, candidate combinations in a group whose number of elements in each combination is the largest is extracted and selected (Step c12).

Then, the recommended visit area determination unit 307 searches, from the facility information database 304 using the facility information search unit 308, information of a facility which exists in a visit area included in the candidate combination selected at Step c12, then sends the obtained information of the facility to the requesting mobile terminal via the information communication control unit 301 and the network IF 109, and the processing is complete (Step c13).

Figure 12:
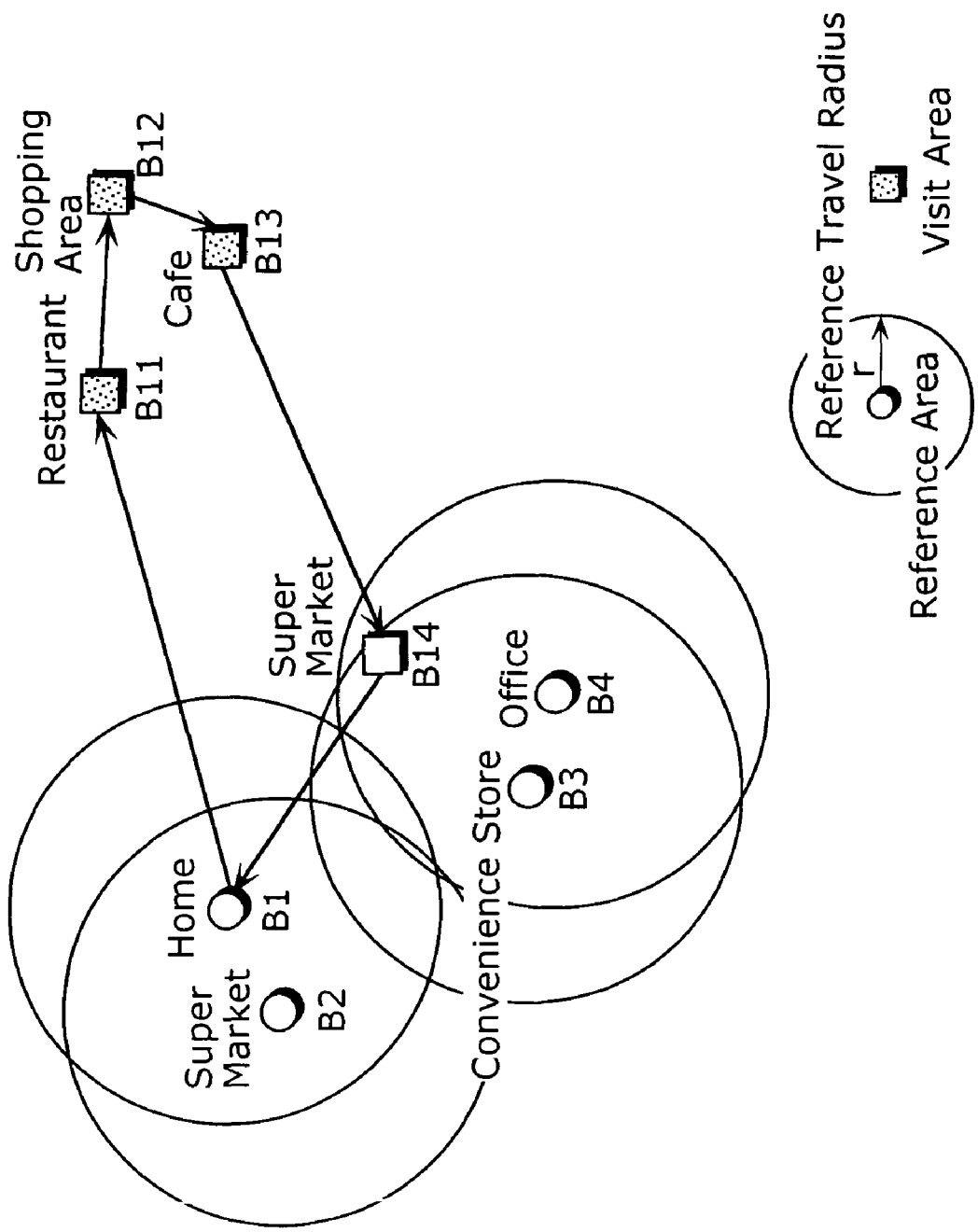
FIG. 12 is a diagram showing one example of the visit history.

The following describes, as one example, a behavior pattern of a user A who lives in Kyoutanabe-city, with reference to FIG. 12. The user A lives in an area B1 and commutes to an office in an area B4. The user A is assumed to often visit a super-market in an area B2 which is near the user A's home and a convenience store in an area B3 which is near the user A's office. In this case, the areas B1, B2, B3, and B4 are extracted as reference areas, and data of the areas stored in the reference area storage unit 204 are as shown in FIG. 13.

Now, the user A and his wife have a first trip to Shiga prefecture by car on Feb. 1, 2003. The user A has a vehicle navigation system as the mobile terminal. The user A and his wife leave home at 11:30, arrive at a restaurant in the area B11 to spend one hour there, then move to a shopping area in the area B12 to spend two hours, then go to a cafe in the area B13 to spend for one hour, finally do shopping at a super market in the area B14, and then go home. Here, distances from the areas B11, B12, and B13 to the reference areas B1 to B4, respectively, are greater than the user A's reference travel radius, and furthermore stay periods in the areas B11, B12, and B13 are more than ten minutes respectively, so that information of areas B11, B12, and B13 are added to the visit history list as shown in FIG. 14. However, distances from the area B14 to the reference areas B3 and B4 respectively are less than the user A's reference travel radius, so that information of the area B14 is not added to the visit history list.

As a result, a visit history of the user A as shown in FIG. 6 is registered in the visit history database 303.

Next, a user X and her husband also have a trip to Shiga prefecture by car on Feb. 2, 2003. The user X also has a vehicle navigation system as the mobile terminal. The user X and her husband leave home at 12:30 and arrive at the restaurant in the area B11 to spend one hour there. Then, they return to their car and search recommended facilities by the vehicle navigation system. Then, the vehicle navigation system sends to the server apparatus 6 a visit history [(B11, 12:30, 60)], and requests the server apparatus 6 to provide information of recommended facilities. The server apparatus 6 searches, from the visit history database 303, visit histories of other users including the travel history [(B11, 12:30, 60)], and finds the following histories including the user A's visit history [(B11, 11:30, 60), (B12, 13:00, 120), (B13, 15:30, 60)]. Here, only identifiers are listed for simplifying the description.

A: [B11, B12, B13],
B: [B11, B12, B13, B14]
C: [B11, B13]
D: [B10, B11, B12, B13, B15]
E: [B11, B12, B13, B15]
F: [B10, B11, B12, B15]
G: [B11, B12, B14]
H: [B11, B12, B16, B13, B15]
I: [B10, B11, B12, B13, B15]

From the above histories, the following recommended area candidates whose number of visiting users are more than five people respectively are extracted.

<Number of Elements—1>
[B12] (eight people)
[B13] (seven people)
[B15] (five people)

<Number of Elements—2>
[B12, B13] (six people)
[B12, B15] (five people)
[B13, B15] (five people)

<Number of Elements—3>
[B12, B13, B15] (five people)

Figure 15:
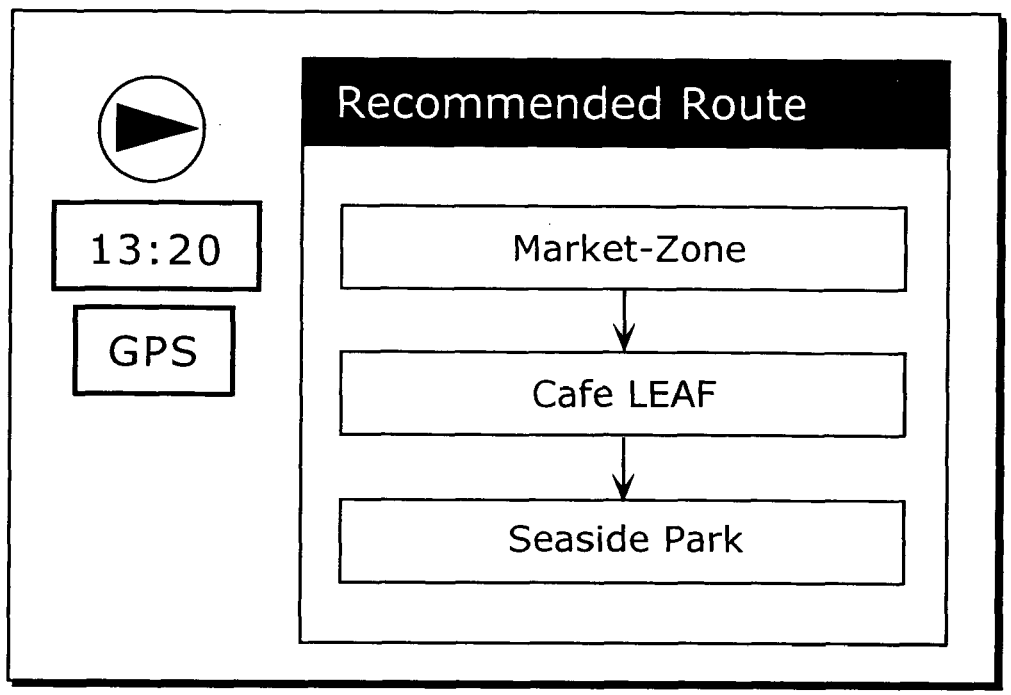
FIG. 15 is a diagram showing one example of a screen display.

Here, [B12, B13, B15] is selected as a recommended area candidate whose number of elements is the largest, and after searching the facility information database 304, information of "Market-Zone", "Café LEAF", "Seaside Park" are sent to the user X's vehicle navigation system. In the user X's vehicle navigation system, the information is displayed on a screen as shown in a display example of FIG. 15.

Accordingly, in the same manner as described for the user A, the user's visit history of areas except the reference area is automatically registered in the server apparatus 6, and in the same manner as described for the user X, the information of the recommended facilities can be easily obtained by referring to the visit histories of other users.

Note that, in order to simplify the description, the first operation example has used a simple algorithm for extracting recommended area candidates, but it is also possible to use other algorithms with a low calculation cost using such as a divide-and-conquer method.

Note also that, regarding information that is stored in databases except the visit history database 303, it is possible to record such information from the server apparatus 6 into a medium such as a DVD-ROM, and manage the information by the mobile terminals.

The mobile terminals may accomplish the processing by appropriately downloading the information stored in the visit history database 303 into a memory medium such as a removable media, in the case that the mobile terminals cannot communicate with the server apparatus at real time.

Note also that the first embodiment has described that the facility information refers to the area, but the information may refer to a vicinity of the visit area, or a facility which is far from the visit area with a predetermined distance, which are stored in the server apparatus 6 and provided to the user, as area vicinity information.

Second Operation Example

The following describes the second operation example for obtaining information of recommended facilities by referring to visit histories of other users, when the user visits an unfamiliar place.

Figure 16:
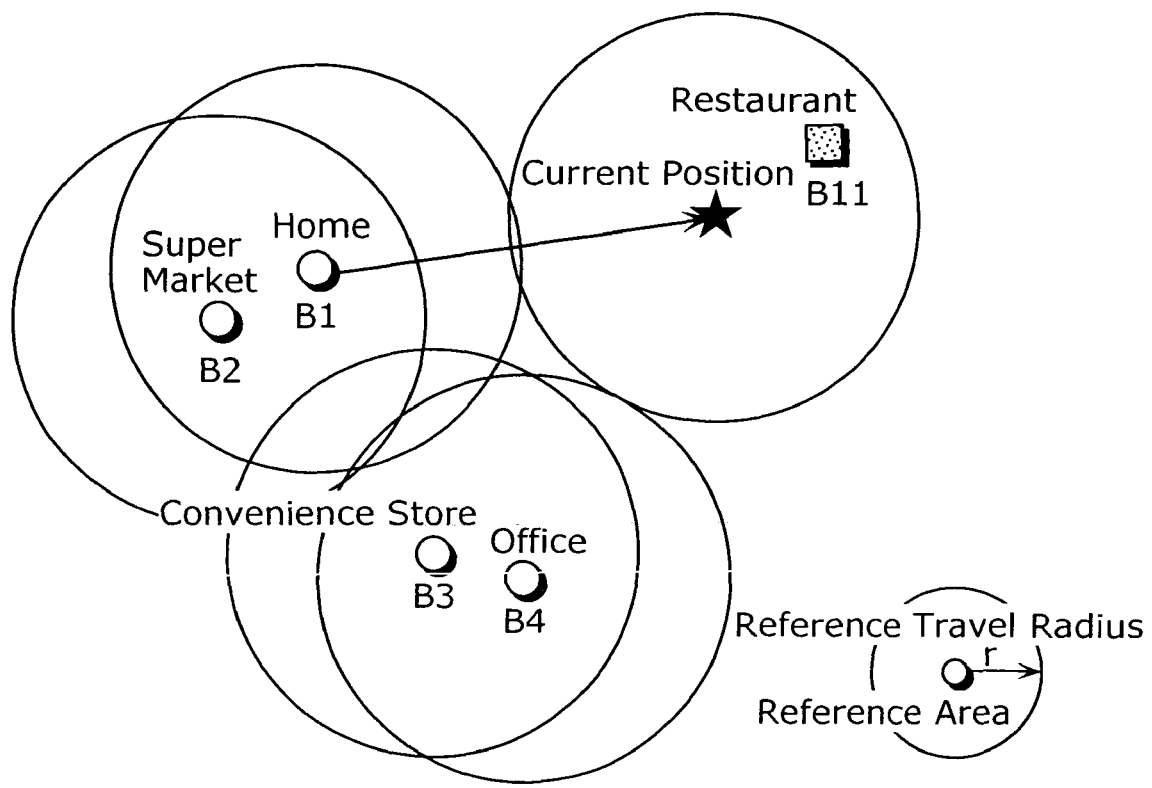
FIG. 16 is a diagram showing one example of the visit history according to the second operation example.

Now, as shown in FIG. 16, the user is assumed to be at a position which is far from all reference areas with a distance greater than the reference travel radius using each reference area as a center. Note that the second operation example defines, as the unfamiliar place, the position which is far from all reference areas with a distance greater than the reference travel radius using each reference area as a center, and the reference travel radius may be set appropriately depending on the user's travel means such as by vehicle or on foot.

In this case, it is possible to obtain the recommended facility information by extracting, from the visit history database 303, the facilities which exist within the reference travel radius using the current position as a center and which many users have visited.

Note that many facilities have their busy time when the users often visit. For example, a restaurant has a busy time from 11:30 to 14:00 in lunch hours. It is possible to roughly determine in which time zone the users often visit a facility by referring to the visit history database 303 and examining a distribution of visit time. Here, one example of processing for providing information of the recommended facilities near the current position in consideration of the busy time zone is described with reference to FIGS. 17 and 18.

Figure 17:
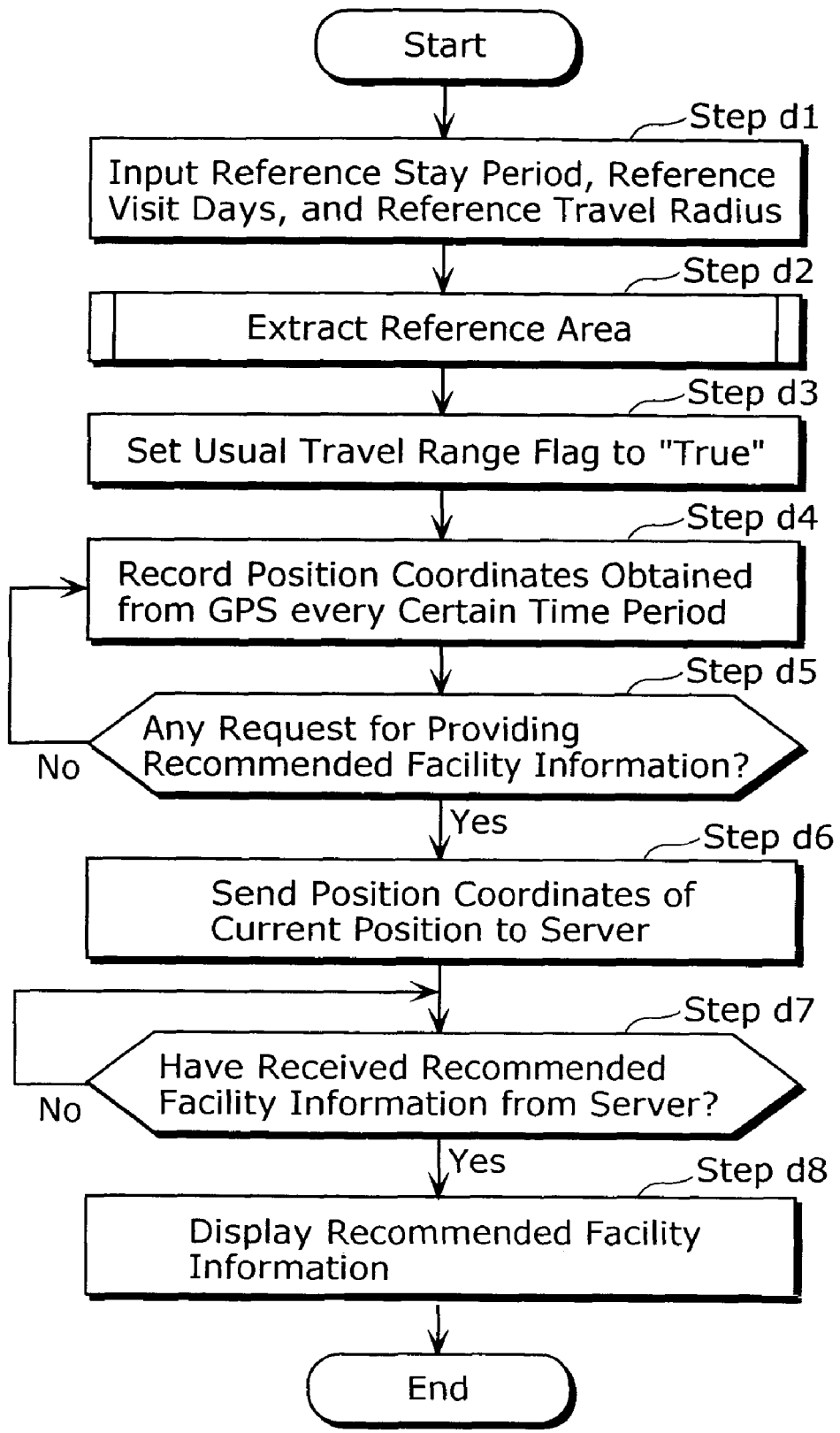
FIG. 17 is a flowchart showing processing performed by the mobile terminal.

FIG. 17 is a flowchart showing processing performed by one of the mobile terminals 1 to 3 to provide the user with the information of the recommended facilities near the current position in consideration of the busy time zone.

Firstly, the mobile terminal 1 performs the same processing as Step b1 to Step b4 shown in FIG. 10 (Steps d1 to d4).

Next, a determination is made as to whether or not the user enters a request for providing recommended facility information, and if there is a request, then the processing proceeds to Step b6, but if not, then the processing loops back to Step b4 (Step d5).

When there is a request, the mobile terminal 1 sends position coordinates of the current position to the server apparatus 6 (Step d6).

Then, if the mobile terminal 1 receives the recommended facility information from the server apparatus 6, then the processing proceeds to Step d8, and if not, then the mobile terminal 1 stands by until receiving a reply from the server apparatus 6 (Step d7).

Figure 19:
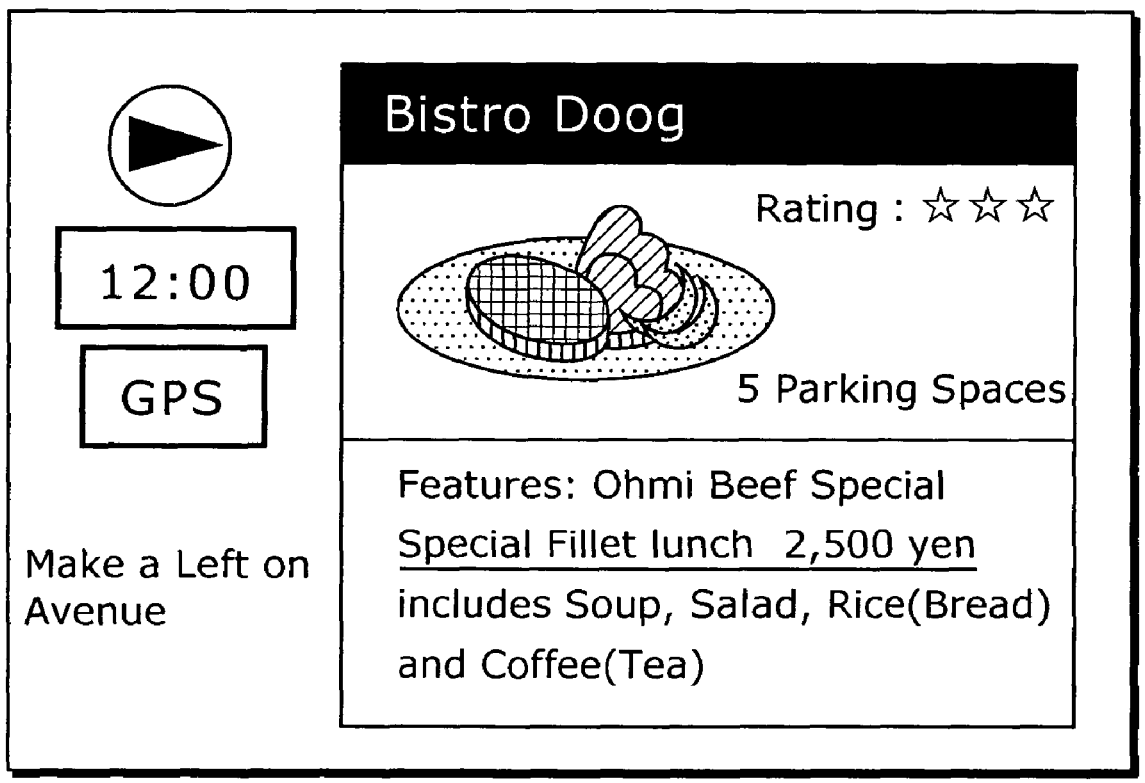
FIG. 19 is a diagram showing one example of a screen display.

The mobile terminal 1 displays on the display 105 the recommended facility information received at Step d7, and the processing is complete (Step d8). FIG. 19 shows one example of the displayed recommended facility information.

Figure 18:
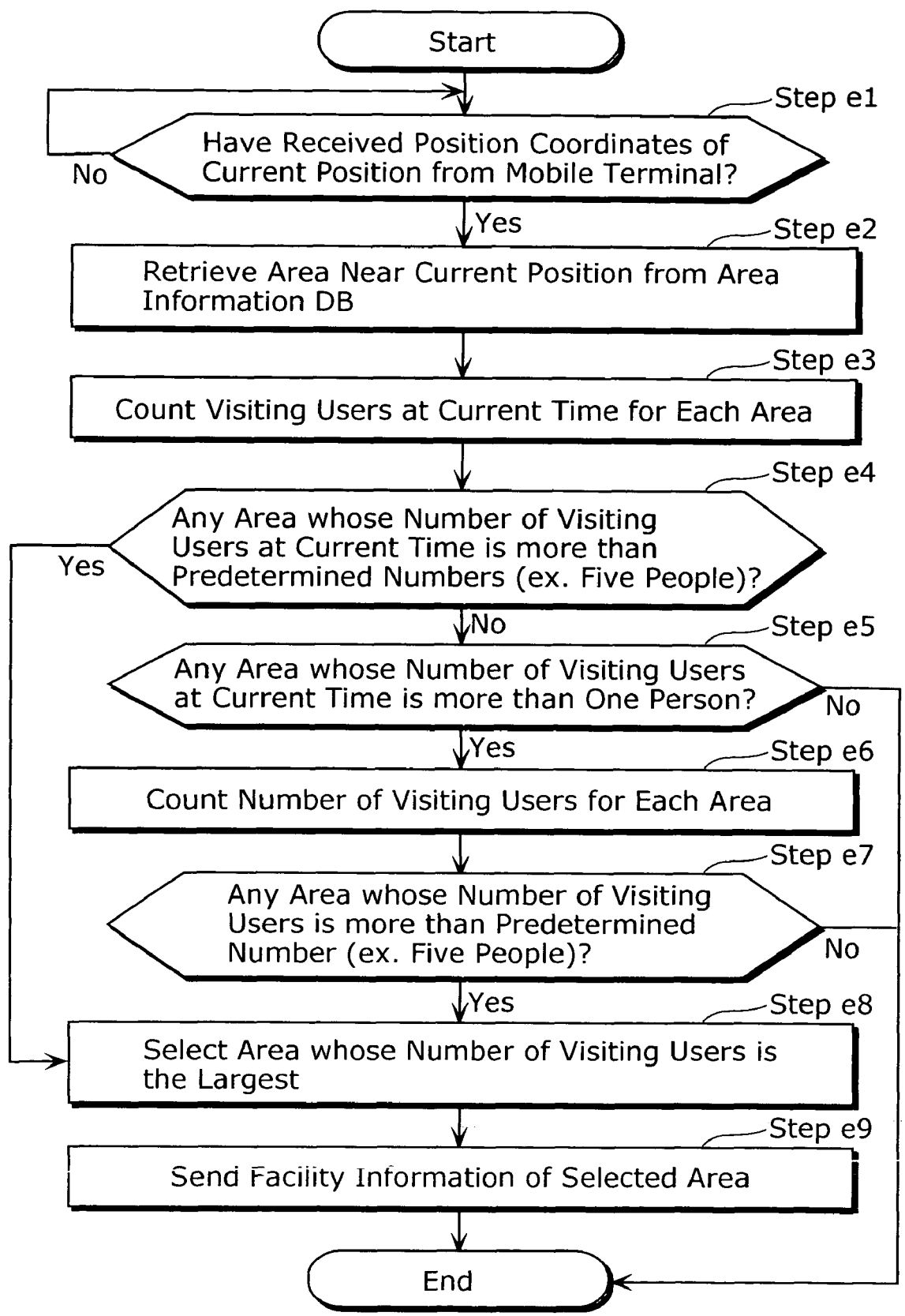
FIG. 18 is a flowchart showing processing performed by the server apparatus.

FIG. 18 is a flowchart showing processing performed by the server apparatus 6 to provide the information of the recommended facilities near the current position in consideration of the busy time zone.

Firstly, the server apparatus 6 determines whether or not position coordinates of the current position are received from the mobile terminal, and if the position coordinates are received, then the processing proceeds to Step e2, but if not, then processing stands by until receiving a request from the mobile terminal (Step e1).

When the position coordinates of the current position are received from the mobile terminal, the server apparatus 6 retrieves, using the area information database 302 and the facility information database 304, information of areas including facilities which exist within 5 km using the position coordinates received at Step e1 as a center, and stores information of the areas into the work area (Step e2).

Then, the recommended visit area determination unit 307 in the server apparatus 6 counts the number of users visiting, at the current time, all areas stored in the work area, by referring to the visit history database 303 (Step e3).

Next, a determination is made as to whether or not there is any area whose number of visiting users is more than a predetermined number, for example more than five people, and if there is such an area, then the processing jumps to Step e8, and if not, then the processing proceeds to Step e5 (Step e4). This processing is performed to extract, as a priority, an area whose number of visiting users is the largest at the current time.

When there is no area whose number of visiting users is more than the predetermined number, a determination is made as to whether or not there is any area whose number of visiting users is more than one person, and if such an area exists, then the processing proceeds to Step e6, but if not, then the processing is complete (Step e5).

When there is an area whose number of visiting users is more than one person, the number of visiting users is counted for all area stored in the work area, by referring to the visit history database 303 (Step e6).

Then, a determination is made as to whether there is any area whose number of visiting users is more than five people in all areas stored in the work area, and if there is such an area, then the processing proceeds to Step e8, but if not, then the processing is complete (Step e7). This processing is performed to extract, as a priority, an area whose number of visiting users is the largest at the current time.

Then, the server apparatus 6 selects an area whose number of visiting users is the largest (Step e8).

Subsequently, the recommended visit area determination unit 307 searches and obtains, from the facility information database 304 using the facility information search unit 308, facility information of the area selected at Step e8, sends the facility information to the mobile terminal, and the processing is complete (Step e9).

Note that, at Step d5, it is possible to send the current position to the server apparatus 6 every predetermined time period using a timer, instead of receiving entries by the user. Thereby the recommended facility information, if any, can be automatically provided to the user.

Note also that the priority of the selected recommended facilities can be changed using information of the weather, the season, and the like, besides the time. Thereby it is possible to adjust to restrictions of user's visited places or changes of the user's behavior patterns depending on the weather, the season, and the like.

Thus, according to the second operation example, when the user visits an unfamiliar place, it is possible to provide the user with the recommended places and information regarding the places, based on behavior patterns of other similar users, in consideration of a behavior pattern of the user up to a current time. Furthermore, by automatically registering, in the server apparatus 6, the visit history of areas except the reference area, it is possible to register more visit histories of users than visit histories registered by user's entries, it is possible to share a lot of useful information within a plurality of users.

Still further, by automatically extracting, as report candidates, places where many users have visited but whose information is not registered in the facility information database 304, it becomes relatively easy to gather word-of-mouth information in view of the users Still further, by recording the number of visits in areas except the reference area into another table or the server apparatus 6, when the user visited an area where the user has already visited, it is possible to provide the user with, as information of the area, difference between the current time and last visit time.

Furthermore, the first embodiment has described the example in which information is provided for the areas which are relatively near the reference area, but it is possible to provide accommodations information and the like when the user has a trip to a far place. In this case, by registering information of the user's reference area into the server apparatus 6, it is possible to change types of recommend information depending on a distance between the user's living range and a user's current position, for example by setting to provide the user with accommodation information when the user drives in Kyoto if the user's living range is away from more than 100 km radius from the current position.

Second Embodiment

The following describes an information providing system according to a second embodiment of the present invention.

The first embodiment has described that the recommended places and information regarding the places can be automatically provided to the user by using the behavior patterns of other similar users. Especially when the user visits an unfamiliar place, it is possible to provide the user with the information regarding recommended places in consideration of the user's behavior pattern up to a current time.

The second embodiment differs from the first embodiment in that a user's return route can be searched, when the user visits a place for the first time for a trip or the like, by using travel histories of other users who have visited the same place and whose living ranges are similar to the user's living range, in other words, whose reference areas are near the user's reference area. For example, when the user visiting a ski resort searches a return route, it is possible to search on which route other users whose reference areas are near the user's reference area have gotten to the ski resort and on which route the other users have returned to their reference areas from the ski resort. In general, there are a plurality of routes on a map to get to a ski resort or the like. Road surface conditions of the routes especially near the ski resorts or the like are not good because of snow, and sometimes, only routes which many users use have snow removal equipments. Furthermore, a route with a lot of traffic would have better road surface conditions since snow on such a road melts sooner. It is difficult to check such road surface conditions by using only a map.

Therefore, the second embodiment provides an apparatus for searching a route, when the user arrives at or travels to a ski resort, by using information presenting on which route other users whose reference areas are similar to the user's reference area have chosen to get to the ski resort (destination).

Figure 20:
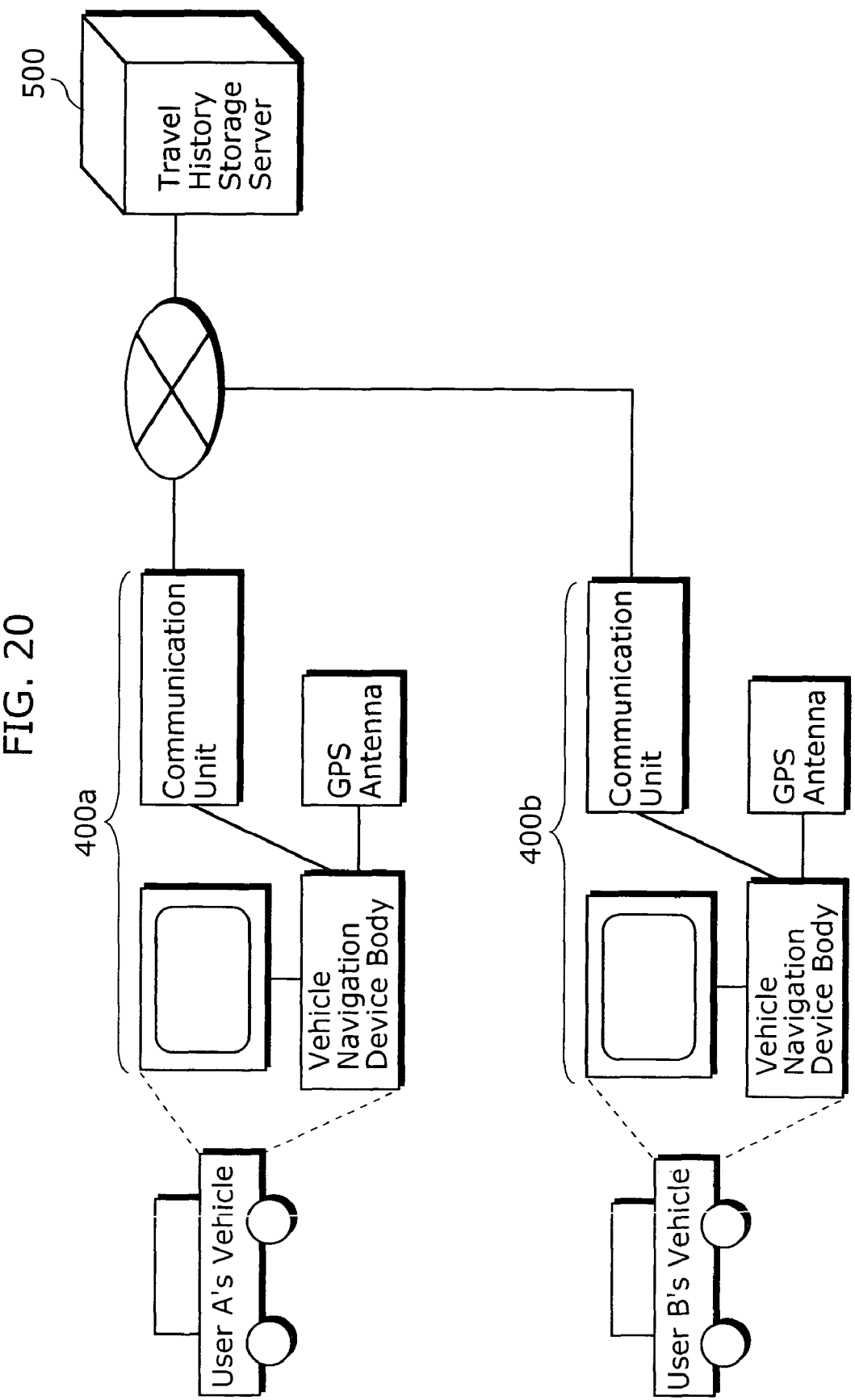
FIG. 20 is a diagram showing a structure of an information providing system according to a second embodiment.

FIG. 20 is a diagram showing a structure of an information providing system according to the second embodiment. The information providing system includes: vehicles of a plurality of users A and B that are equipped with in-vehicle terminals 400*a* and 400*b* respectively, each of which has a vehicle navigation device body, an in-vehicle display, a communication unit, and a GPS antenna; and a server apparatus 500 that is connected to the in-vehicle terminals 400a and 400b via a communications network.

Figure 21:
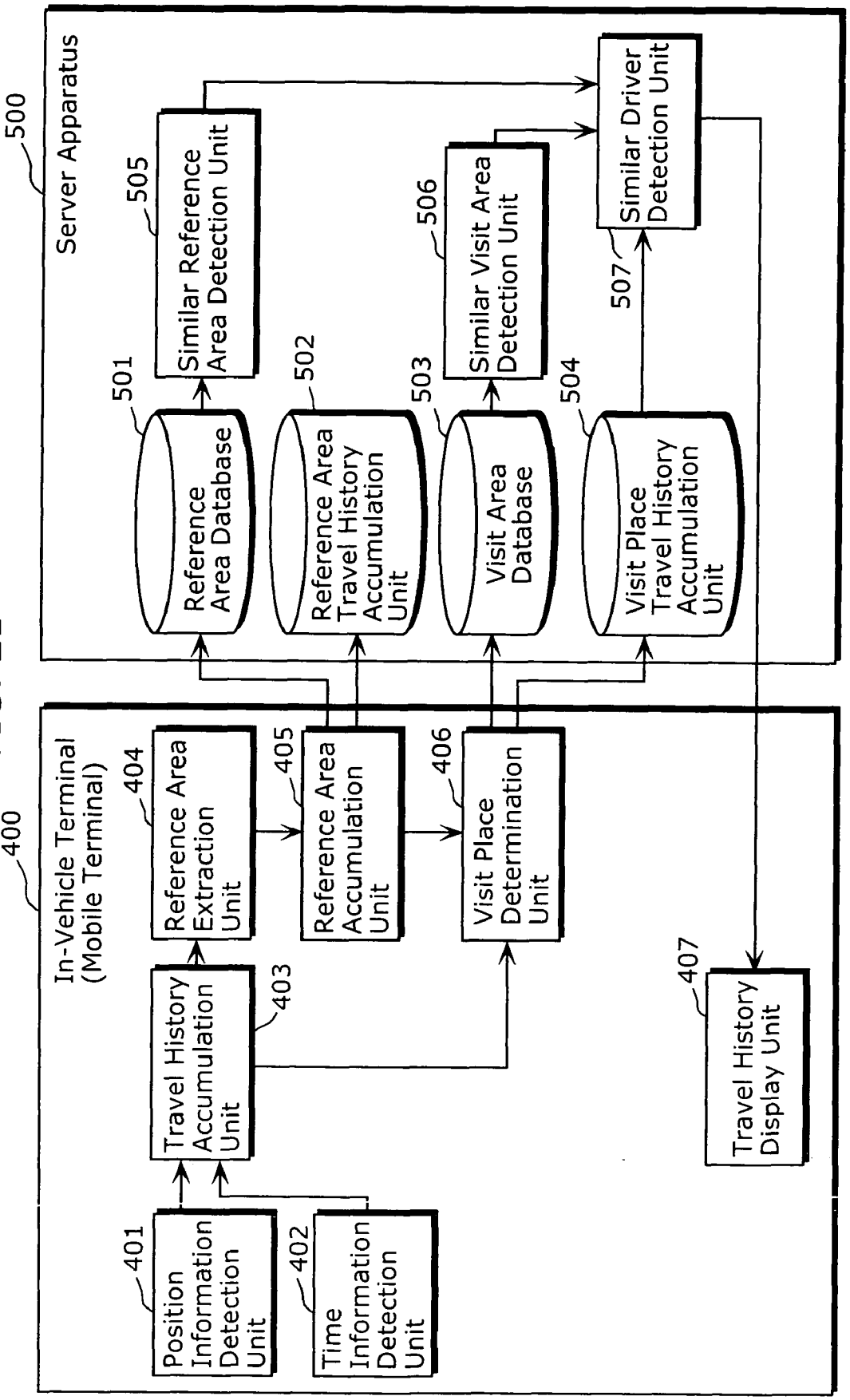
FIG. 21 is a functional block diagram showing the information providing system shown in FIG. 20.

FIG. 21 is a functional block diagram of the information providing system including the in-vehicle terminal 400 and the server apparatus 500 shown in FIG. 20.

The in-vehicle terminal 400 includes: a position information detection unit 401 which generates position information by detecting a position of the vehicle by using the GPS or like; a time information detection unit 402 which generates time information by determining a current time by using a calendar timer or the like; a travel history accumulation unit 403 which generates and accumulates travel history information of the user by sampling and accumulating, every certain time period, the position information generated by the position information detection unit 401 and the time information generated by the time information detection unit 402; a reference area extraction unit 404 which extracts a reference area from the travel history information accumulated in the travel history accumulation unit 403 by using the processing described in the first embodiment (processing shown in FIG. 8); a reference area accumulation unit 405 which accumulates information of the reference area extracted by the reference area extraction unit 404 together with the travel history information and sends the information of the reference area and the travel history information to the server apparatus 500; a visit place determination unit 406 which extracts, from the travel history information accumulated in the travel history accumulation unit 403, visit areas except the reference area, by referring to the information of the reference areas accumulated in the reference area accumulation unit 405, using the processing as described in the first embodiment (processing shown in FIG. 10), and then sends the information of the visit areas together with the travel history information to the server apparatus 500; a travel history display unit 407 which displays information regarding travel histories of similar users notified by the server apparatus 500, who are other users whose reference areas and visit areas are the same as or similar to the user's reference area and visit area.

On the other hand, the server apparatus 500 includes: a reference area database 501 which accumulates the information of reference area sent from the reference area accumulation unit 405 in the in-vehicle terminal 400, as shown in a database of FIG. 22; a reference area travel history accumulation unit 502 which accumulates the information of reference area sent from the reference area accumulation unit 405 in the in-vehicle terminal 400 in association with the travel history information; a visit area database 503 which accumulates, as a visit area, information regarding the visit place sent from the visit place determination unit 406 in the in-vehicle terminal 400, as shown in the database of FIG. 23; a visit place travel history accumulation unit 504 which accumulates, as visit place travel history information shown in FIG. 24, the visit place information and the travel history information that have sent from the visit place determination unit 406 in the in-vehicle terminal 400; a similar driver detection unit 507 which detects, as a similar driver, another user whose travel history is the same as or similar to the reference area and visit area of the requesting user, by referring to visit place travel history information of a plurality of users accumulated in the visit place travel history accumulation unit 504, and notifies the in-vehicle terminal 400 of the travel history information of the similar driver; a similar reference area detection unit 505 which searches a reference area that is similar to the user's reference area by referring to the reference area database 501 in response to a detection request from the similar driver detection unit 507; and a similar visit area detection unit 506 which searches a visit area that is similar to the user's visit area by referring to the visit area database 503 in response to a detection request from the similar driver detection unit 507.

The information providing system can extract and select the reference area and the visit area by using the travel history information as described in the first embodiment, and also can accumulate the travel history information to the server apparatus 500 in association with the area information extracted for each travel history information.

The visit place travel history information accumulated in the visit place travel history accumulation unit 504 is recorded data of the travel history of each user as shown in FIG. 24, in order to indicate that each position information obtained every certain time period are obtained in a reference area, in a visit area, or during a travel. By accumulating the visit place travel history information in such a format, it is possible to check on which route (position information in a chronological order) each user has gotten to each visit area. For example, it is possible to determine on which route each user moves from a certain visit area to the reference area. Furthermore, it is also possible to calculate a time period required to move between the areas.

Figure 25:
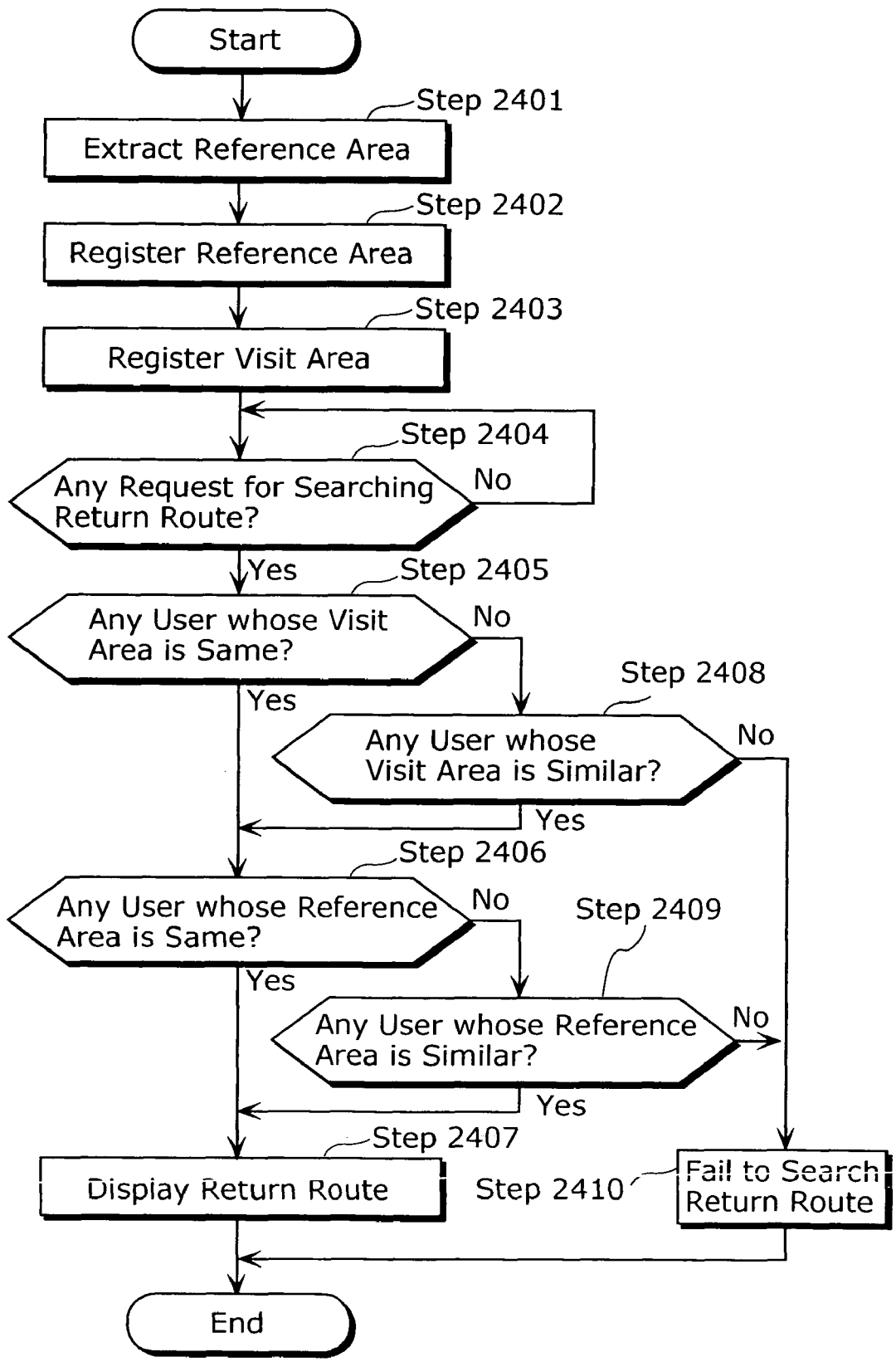
FIG. 25 is a flowchart showing processing performed by the information providing system.

FIG. 25 is a flowchart showing operation processing performed by the information providing system with the above-described structure.

Firstly, in the in-vehicle terminal 400, the travel history accumulation unit 403 accumulates travel history information which includes position information generated by the position information detection unit 401 and time information generated by the time information detection unit 402, and the reference area extraction unit 404 extracts a reference area from the accumulated travel history information and accumulates the reference area into the reference area accumulation unit 405 (Step 2401).

Then, the reference area accumulation unit 405 registers the accumulated reference areas into the server apparatus 500 (Step 2402).

Subsequently, the visit place determination unit 406, by referring to the reference areas accumulated in the reference area accumulation unit 405, extracts visit areas except the reference area from the travel history information accumulated in the travel history accumulation unit 403, and registers the extracted visit areas into the server apparatus 500 (Step 2403).

The above processing is the same as the processing performed by the reference area extraction unit 203 and the visit area registration unit 206 of the mobile terminal 1 in the first embodiment. The above processing differs from the processing in the first embodiment in that, as shown in FIG. 26, reference areas and visit areas for each user are included in the visit place travel history information which is registered from the visit place determination unit 406 of the in-vehicle terminal 400 into the visit place travel history accumulation unit 504 of the server apparatus 500. Note that the visit place travel history information shown in FIG. 26 is formed by collecting a plurality of the visit place travel history information of each user shown in FIG. 24. FIG. 26 shows only reference areas and visit areas extracted from the visit place travel history information in FIG. 24. The following describes processing using the visit place travel history information shown in FIG. 26.

The server apparatus 500 determines whether or not a request for searching a return route is received from a certain user (in-vehicle terminal 400), and if there is no such a request, then repeats the same step, but if such a request is received, then proceeds to the next step (Step 2404).

Figure 27:
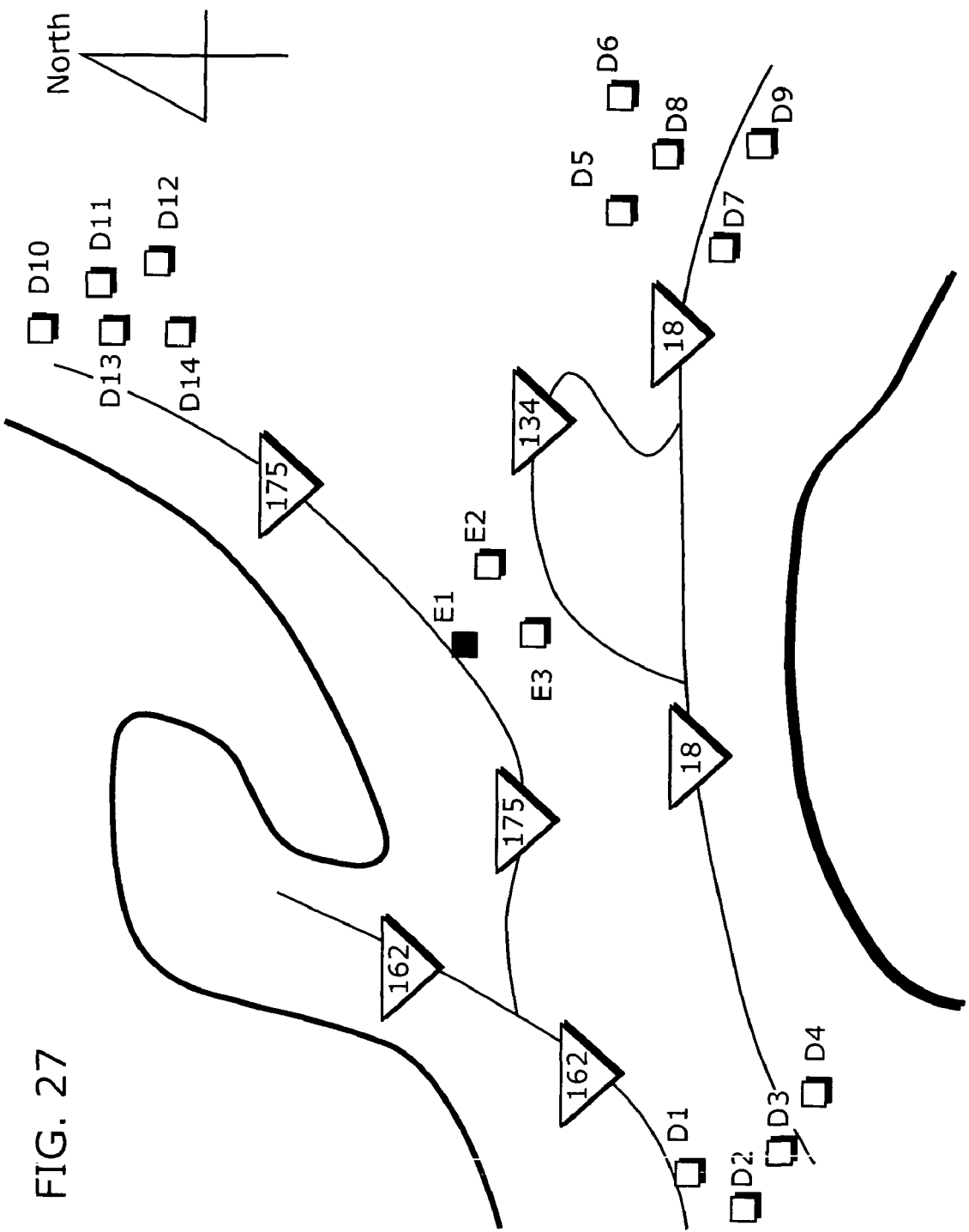
FIG. 27 is a map showing one example of a user's travel.

When the request is received, the similar driver detection unit 507, by firstly referring to the visit place travel history information of each user accumulated in the visit place travel history accumulation unit 504 in order to detect a similar driver, searches whether or not there is any user who has visited the current visit area E1 (Step 2405). Here, as shown in FIG. 27, a map shows the user, whose reference areas are D1 to D4, a plurality of routes getting to the visit area E1: a route on a road 175 and then a road 162, and another route on a road 134 and then a road 18. Moreover, another user whose reference areas are D5 to D9 can get to the visit area E1 on still another route on the road 18 and then the road 134. Now, a user A1, whose reference areas are D1 and D2, arrives at the ski resort E1. Then, other users A2 and A6 are selected as users who have already visited the E1. Since there are users whose visit areas are the same as the user A1's visit area, the processing proceeds to Step 2406. When there is no user whose visit area is the same as the user A1's visit area, the processing proceeds to Step 2408.

Subsequently, the similar driver detection unit 507, by referring to the visit place travel history information of each user accumulated in the visit place travel history accumulation unit 504, searches a user whose reference area as well as visit area are the same as the user A1's reference area as well as visit area (Step 2406). Here, the user A1's reference areas are D1 and D2. The user A2's reference areas are D2 and D3, and the user A6's reference area is D10. Therefore, the user A2 is selected since the user A2's reference area D2 is also the user A1's reference area. Since there is a user whose reference area is the same as the user A1's reference area, the processing proceeds to Step 2407. When there is no user whose reference area is the same as the user A1's reference area, the processing proceeds to Step 2409.

Figure 28:
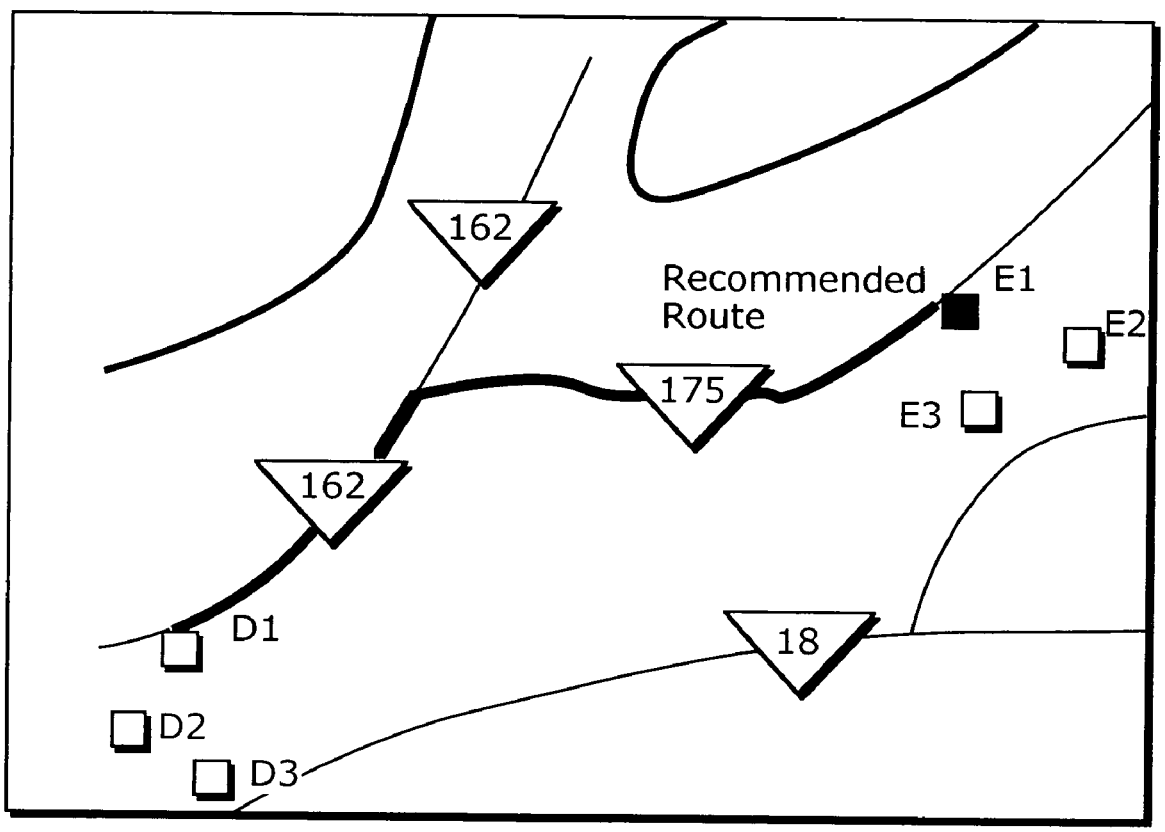
FIG. 28 is a diagram showing one example of display by an in-vehicle terminal.

When there is a user whose reference area is the same as the user A1's reference area, the similar driver detection unit 507 notifies the in-vehicle terminal 400 of the route information regarding the detected similar driver, and eventually the travel history display unit 407 of the in-vehicle terminal 400 displays the notified route information, for example, a route by which the user A2 has used to travel from the visit area E1 to the reference area D2 (Step 2407). As a result, as shown in FIG. 28, the route along the road 175 and then the route 162 is presented to the display terminal such as a vehicle navigation system.

On the other hand, if there is no user whose visit area is the same as the user A1's visit area (No at Step 2405), then the similar driver detection unit 507 of the server apparatus 500 searches users who have visited a similar visit area (Step 2408). A determination is made as to whether or not searched visit areas are similar to the user A1's visit area is performed by the similar visit area detection unit 506 that has received the detection request from the similar driver detection unit 507, by referring to the visit area database 503 shown in FIG. 23, using address information of area identifiers. For example, area identifiers of addresses in Gifu prefecture can be used to determine that areas identified by the identifiers are similar to one another. Furthermore, when the area identifiers are associated with information indicated by latitude and longitude, those area identifiers are used to determined, using a Euclidean distance, whether or not the area with the area identifiers are similar to one another. Therefore, even if there is no user who has visited the E1, it is possible to determine that a user who has visited a E2 has visited a similar visit area.

Also, if there is no user whose reference area is the same as the user A1's reference area (Step 2406, No), the similar driver detection unit 507 searches users whose reference areas are similar to the user A1's reference area (Step 2409).

A determination is made as to whether or not searched reference areas are similar to the user A1's reference area is performed by the similar reference area detection unit 505 which has received the detection request from the similar driver detection unit 507, by referring to the reference area database 501 shown in FIG. 22, using address information and information indicated by latitude and longitude which are assigned to the area identifiers.

Thus, if there is any user whose reference area as well as visit area are the same as or similar to the user A1's reference area and visit area, the route information of the selected user is notified by the server apparatus 500 to the in-vehicle terminal 400, and displayed by the in-vehicle terminal 400 (Step 2407).

In the above-described processing, by searching the travel histories of other users whose reference areas and visit areas are similar to the user A1's reference area and visit area, it is possible to automatically search on which route other users have gotten to the visit destination and have returned to their homes in the reference areas. Thereby, even if the user visits an unfamiliar place, it is possible to easily search a route which general users use to return to their homes.

Note that the second embodiment has described the method for searching the route after user's arriving at the ski resort, but the information providing apparatus according to the second embodiment can perform the search effectively even if the visit area is not the ski resort but an amusement facility, a sightseeing spot, or the like.

Note also that the second embodiment has described that the route recommendation is performed by using both of the reference area and the visit area, but the recommendation can be also performed by using only the reference area or only the visit area.

Note also that the second embodiment has described that the route recommendation is performed by using the travel history information by the in-vehicle terminal 400, but the recommendation can be performed by a portable telephone, a PDA, or the like which has a position determination function such as the GPS.

Note also that the second embodiment has described that the search is performed for a similar user who has one similar reference area, but if there is a similar user that has a plurality of similar reference areas, it is possible to recommend a route and information of a similar user, by using the route information of the similar user, as a priority.

Note also that the second embodiment has described the method for searching a return route after the user's arriving at the ski resort, but by previously designating the user's visit destination, it is possible to notify the user, before the user arrives at the ski resort, on which route other users whose reference areas are similar to the user's reference area have used.

A general vehicle navigation system searches a route which is the shortest route or a route with an inexpensive toll, but the information providing system according to the present invention can search a route which general users choose.

Note also that the second embodiment has described that the route from the ski resort (visit area) to the reference area is searched and displayed, but it is also possible to search a time period required for other users to get to the ski resort on the route. Note also that FIG. 28 shows one route, but it is also possible to display a plurality of routes depending on the number of other traveling users. It is further possible to display an average time period to get to the reference area along each route.

Note also that the second embodiment has described that the route from the ski resort (visit area) to the reference area is searched and displayed, but there is a case that the user travels on a route which is different from the route from the reference area to the visit area, since the user wishes to pick up the user's friends in a different area in order to visit the visit area with the friends, and after picking up the friends, the user heads to the visit area as a destination. In this case, a desired route cannot be always searched when a route getting to the visit area is searched by using the reference area. Therefore, by previously designating a position where the user picks up the friends as well as the reference area, it is possible to search a route on which other users travel between the pick-up position and the visit area. Thus, even if the user has not yet arrived in the visit area, it is possible to search a route on which other users travel, by previously designating a departure point and a destination on a map.

Furthermore, in the second embodiment, the information providing apparatus searches a route by using similarity in reference areas and visit areas respectively, and in the first embodiment, the information providing apparatus recommends the user places to be visited, but as shown in FIG. 29, it is possible to check which visit area other similar users have visited, or on which route the other users have traveled, by previously inputting, as initial profiles, a sex, a hobby, the number of family member regarding each user and by later referring to the profiles. Suitable places to be visited would be varied depending on whom the user visits the visit area with, for example, with a partner, friends, or family including children, or depending on what kind of facilities the user is interested in, for example historical spots or sport facilities, so that it is possible to recommend the suitable facilities by referring to visit patterns of other users whose profiles are similar to the user.

Note that the second embodiment has described that a similar user is selected by using the positional similarity of reference areas, but it is also possible to select the similar user by using information of the profiles of the reference area shown in FIG. 30. For example, when the user, whose reference area is a commercial city as shown in FIG. 30, visits a visit area, a visit pattern of a user whose reference area is also a commercial city is recommended as a priority. The consideration of similarity in the reference areas as well as the similarity in the visit patterns can improve suitability of the recommendation. Furthermore, if values of population, area dimensions, population density, and the like are accumulated as profiles of the reference area, it is possible to recommend, as places to be visited, information of places where users, whose reference areas are large cities, in other words, whose living ranges are large cities, would visit.

INDUSTRIAL APPLICABILITY

The present invention is suited for use as an information providing apparatus which provides information to a mobile terminal such as a vehicle navigation apparatus and a portable telephone via a communication path, and as an information providing system which include the mobile terminal and a server apparatus connected via the communication path, especially as an information providing system which provides useful information to a user who visits an unfamiliar area.

The invention claimed is:

1. An information providing apparatus which provides information to a traveling user, the information providing apparatus comprising:
    a travel history record unit configured to record travel histories of a plurality of users including the traveling user to whom the information is to be provided;
    a reference area extraction unit configured to extract an area as a reference area of each of the plurality of users from the travel histories recorded in said travel history record unit, the area being within a predetermined distance from a place each of the plurality of users has stayed more than a predetermined number of times and a living area of each of the plurality of users;
    a visit area extraction unit operable to extract a user visit area of each of the plurality of users from the travel histories recorded in said travel history record unit, the user visit area being determined based on a place where each of the plurality of users has stayed which is less than the number of times determined from the place in the reference area and greater than the predetermined distance from the extracted reference area, wherein the predetermined distance is greater than a travel distance of the reference area;
    a visit history record unit configured to record visit histories of each of the plurality of users, wherein each of the visit histories includes at least one visit area, and one of the visit histories is a user visit history that includes the user visit area; and
    an information providing unit configured to provide the traveling user with information regarding the user visit area of the traveling user recorded by said visit history record unit,
    wherein said information providing unit is further operable:
    to provide the traveling user with information regarding the user visit area that does not include the reference area of the traveling user, and not to provide the traveling user with information regarding the reference area of the traveling user, and
    to determine the information to be provided, based on a similarity between (i) the user visit area of the traveling user, and (ii) the user visit area of another user of the plurality of users except the traveling user,
    wherein said visit history record unit is configured to record, as the user visit history, a travel history which includes the reference area of the traveling user; and
    said information providing unit is further configured to identify another user having a visit area that is the same or substantially the same as the visit area included in the user visit history, and that has a reference area that is the same or substantially the same as the reference area included in the user visit history, and to provide the information regarding the user visit area by using a visit history of the identified other user, and
    wherein said information providing unit is further configured to provide information regarding a return route from a destination in the user visit area by using a travel history included in the visit history of the other user.

2. The information providing apparatus according to claim 1, wherein:
    said travel history record unit is further configured to record, as the travel history, position information of the user with related time and date information; and
    said reference area extraction unit is further configured to extract from the travel history the reference area comprising a place the user visits, based on a predetermined stay time period and a predetermined number of days stayed.

3. The information providing apparatus according to claim 1, wherein said information providing unit is further configured to provide information of a visit area which is different from the user visit area, the visit area being extracted from visit areas included in the visit history of the other user.

4. The information providing apparatus according to claim 3, wherein said information providing unit is further configured to provide information of a visit area that a plurality of other users have visited, the visit area being extracted from visit areas which are different from the user visit area.

5. The information providing apparatus according to claim 3, wherein:
said visit history record unit is further configured to record, as the visit history, a travel history which includes one of a time, a stay period, a day of the week, a weather condition, and a season when the user visited the user visit area; and
said information providing unit is further configured to provide information of a visit area having information that matches one of the time, the stay period, the day of the week, the weather condition, and the current season, the visit area being extracted from the visit histories recorded in said visit history record unit.

6. The information providing apparatus according to claim 1, wherein the information regarding the return route includes a route which the other user has used, and a time period required for the other user to travel on the route.

7. The information providing apparatus according to claim 1, wherein said information providing unit is further configured to provide the information regarding the user visit area by using a visit history of another user having recorded profile information that is the same or substantially the same as profile information of the user.

8. The information providing apparatus according to claim 1, wherein said information providing unit is further configured to provide the information regarding the user visit area by using a visit history of another user having recorded profile information of a reference area that is the same or substantially the same as profile information of the reference area of the user.

9. The information providing apparatus according to claim 1, wherein said information providing unit is further configured to include a facility database which includes information of a facility in an area to be the user visit area, and to provide the information of the facility included in the facility database, as information regarding the user visit area.

10. The information providing apparatus according to claim 1, wherein the predetermined distance used in said visit area extraction unit is changed depending on a travel means of the user.

11. The information providing apparatus according to claim 1,
wherein each of the travel histories recorded in said travel history record unit is a set of (a) a position of a corresponding user of the plurality of users, and (b) a time when the corresponding user is at the position, and
said reference area extraction unit is further configured (i) to calculate a value of a travel speed of each of the travel histories from the travel histories recorded in said travel history record unit, and (ii) when the value is greater than a predetermined value, not to use a travel history having the value in the extraction.

12. The information providing apparatus according to claim 1,
wherein said information providing unit is configured to, when the traveling user arrives at a predetermined user visit area at a predetermined time, provide the traveling user with information using (a) information regarding the predetermined user visit area arrived to by another user in the plurality of users and (b) the predetermined time,
the information provided to the traveling user being regarding at least one user visit area visited by the another user after arriving at the predetermined user visit area.

13. The information providing apparatus according to claim 12,
wherein said information providing unit is configured to (i) calculate how many times the another user has visited the at least one user visit area visited after arriving to the predetermined user visit area, and (ii) provide the traveling user with information regarding a user visit area visited most by the another user from among the at least one user visit area.

14. A method for providing information to a traveling user, the method comprising:
recording travel histories of a plurality of users including the traveling user to whom the information is to be provided;
extracting an area as a reference area of each of the plurality of users from the recorded travel histories, the area being within a predetermined distance from a place each of the plurality of users has stayed more than a predetermined number of times and a living area of the plurality of users;
extracting a visit area of each of the plurality of users from the recorded travel histories, the visit area being determined based on a place where each of the plurality of users has stayed which is less than the number of times determined from the place in the reference area and greater than the predetermined distance from the extracted reference area, wherein the predetermined distance is greater than a travel distance of the reference area;
recording visit histories of each of a plurality of users, each of the travel histories including the extracted visit area; and
providing the traveling user with information regarding the extracted visit area of the traveling user recorded,
wherein said providing the traveling user with information includes:
providing the traveling user with information regarding the user visit area that does not include the reference area of the traveling user, and not to provide the traveling user with information regarding the reference area of the traveling user, and
determining the information to be provided, based on a similarity between (i) the user visit area of the traveling user, and (ii) the user visit area of another user of the plurality of user except the traveling user,
wherein said recording visit histories includes recording, as the user visit history, a travel history which includes the reference area of the traveling user; and
said providing the traveling user with information further includes identifying another user having a visit area that is the same or substantially the same as the visit area included in the user visit history, and that has a reference area that is the same or substantially the same as the reference area included in the user visit history, and providing the information regarding the user visit area by using a visit history of the identified other user, and
wherein information regarding a return route is provided from a destination in the user visit area by using a travel history included in the visit history of the other user.

15. A program stored on a non-transitory computer-readable recording medium for use in an information providing apparatus for providing information to a traveling user, the program causing a computer to execute steps comprising:

recording travel histories of a plurality of users including the traveling user to whom the information is to be provided;

extracting an area as a reference area of each of the plurality of users from the recorded travel histories, the area being within a predetermined distance from a place each of the plurality of users has stayed more than a predetermined number of times and a living area of the plurality of users;

extracting a visit area of each of the plurality of users from the recorded travel histories, the visit area being determined based on a place where each of the plurality of users has stayed which is less than the number of times determined from the place in the reference area and greater than the predetermined distance from the extracted reference area, wherein the predetermined distance is greater than a travel distance of the reference area;

recording visit histories of each of the plurality of users, each of the visit histories including the extracted visit area; and providing the traveling user with information regarding the extracted visit area of the traveling user recorded, wherein said providing the traveling user with information includes:

providing the traveling user with information regarding the user visit area that does not include the reference area of the traveling user, and not to provide the traveling user with information regarding the reference area of the traveling user, and determining the information to be provided, based on a similarity between (i) the user visit area of the traveling user, and (ii) the user visit area of another user of the plurality of user except the traveling user, wherein said recording visit histories includes recording, as the user visit history, a travel history which includes the reference area of the traveling user; and said providing the traveling user with information further includes identifying another user having a visit area that is the same or substantially the same as the visit area included in the user visit history, and that has a reference area that is the same or substantially the same as the reference area included in the user visit history, and providing the information regarding the user visit area by using a visit history of the identified other user, and wherein information regarding a return route is provided from a destination in the user visit area by using a travel history included in the visit history of the other user.

16. An information providing system comprising a mobile terminal and a server apparatus, in order to provide information to a traveling user via said mobile terminal, wherein said mobile terminal comprises:

a travel history send unit configured to transmit travel histories of a plurality of users to said sever apparatus; and a presentation unit configured to present to the user, information transmitted from said server apparatus, and said server apparatus comprises:

a travel history record unit configured to record the travel histories of the plurality of users from said travel history send unit of said mobile terminal;

a reference area extraction unit configured to extract an area as a reference area of each of the plurality of users from the travel histories recorded in said travel history recording unit, the area being within a predetermined distance from a place each of the plurality of users has stayed more than a predetermined number of times and a living area of each of the plurality of users;

a visit area extraction unit operable to extract a visit area of each of the plurality of users from the travel histories recorded in said travel history recording unit, the visit area being determined based on a place where each of the plurality of users has stayed which is less than the number of times determined from the place in the reference area and greater than the predetermined distance from the extracted reference area, wherein the predetermined distance is greater than a travel distance of the reference area;

a visit history record unit configured to record visit histories of each of the plurality of users, each of the visit histories including the extracted visit area; and an information providing unit configured to transmit, to the traveling user of said mobile terminal, information regarding the extracted visit area of the traveling user recorded by said visit history record unit, wherein said information providing unit is further operable:

to provide the traveling user with information regarding the user visit area that does not include the reference area of the traveling user, and not to provide the traveling user with information regarding the reference area of the traveling user, and to determine the information to be provided, based on a similarity between (i) the user visit area of the traveling user, and (ii) the user visit area of another user of the plurality of user except the traveling user, wherein said visit history record unit is configured to record, as the user visit history, a travel history which includes the reference area of the traveling user; and said information providing unit is further configured to identify another user having a visit area that is the same or substantially the same as the visit area included in the user visit history, and that has a reference area that is the same or substantially the same as the reference area included in the user visit history, and to provide the information regarding the user visit area by using a visit history of the identified other user, and wherein said information providing unit is further configured to provide information regarding a return route from a destination in the user visit area by using a travel history included in the visit history of the other user.

* * * * *